(12) United States Patent
Frankel

(10) Patent No.: US 10,839,424 B1
(45) Date of Patent: *Nov. 17, 2020

(54) VOICE USER INTERFACE ADVERTISING CONTROL METHOD

(71) Applicant: Noel Frankel, New York, NY (US)

(72) Inventor: Noel Frankel, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/779,706

(22) Filed: Feb. 3, 2020

Related U.S. Application Data

(63) Continuation of application No. 15/819,614, filed on Nov. 21, 2017, now Pat. No. 10,198,747.

(51) Int. Cl.
*G06Q 30/02* (2012.01)
*G06F 3/0481* (2013.01)
*H04L 29/12* (2006.01)

(52) U.S. Cl.
CPC ..... *G06Q 30/0258* (2013.01); *G06F 3/04817* (2013.01); *G06Q 30/0269* (2013.01); *H04L 61/2007* (2013.01)

(58) Field of Classification Search
CPC .................................................. G06Q 30/0258
USPC ...................................................... 705/14.56
See application file for complete search history.

(56) References Cited

U.S. PATENT DOCUMENTS

| | | | | |
|---|---|---|---|---|
| 5,794,210 A * | 8/1998 | Goldhaber | ......... | G06Q 30/0207 705/14.69 |
| 6,128,651 A * | 10/2000 | Cezar | ..................... | G06Q 30/02 709/217 |
| 6,714,975 B1 * | 3/2004 | Aggarwal | ............. | G06Q 30/02 709/224 |
| 8,607,267 B2 * | 12/2013 | Shkedi | ................. | H04N 21/252 725/34 |
| 8,612,226 B1 * | 12/2013 | Epstein | ............. | G06Q 30/0241 704/251 |
| 8,763,033 B2 * | 6/2014 | Dittus | ................ | G06Q 30/0255 725/34 |
| 9,037,486 B2 * | 5/2015 | Ganz | ....................... | A63F 13/71 705/14.68 |
| 9,361,631 B2 * | 6/2016 | Meyer | ................ | G06Q 30/0256 |
| 10,198,747 B1 | 2/2019 | Frankel | | |
| 2009/0234732 A1 * | 9/2009 | Zorman | ................. | G06O 30/02 705/14.55 |
| 2011/0099076 A1 * | 4/2011 | Repas | .................... | G06Q 30/02 705/14.69 |
| 2015/0269614 A1 * | 9/2015 | Kramer | ............. | G06Q 30/0251 705/14.49 |

* cited by examiner

*Primary Examiner* — Sheree N Brown

(57) ABSTRACT

A method is provided that grants users global control of the display of advertisements on a digital content platforms (DCP), as the primary user objection to digital advertising may be solved when content providers grant users control of the quality and relevance of ads for preferred products and services, and when and how often these ads are displayed. The DCP allows users to verbally communicate with a Voice User Interface (VUI), on a device such as a mobile phone, tablet, personal computer, laptop and TV. The VUI system performs speech recognition, and thereby sends the user request to display advertisements. In addition, the VUI may be vocally initiated by the user to remove advertisements. The method prompts users to engage in advertising for preferred products and services through paradigm shifts in permission-based marketing, e-commerce, and gamification.

12 Claims, 16 Drawing Sheets

VOICE USER INTERFACE ADVERTISING CONTROL METHOD

CROSS-REFERENCE TO RELATED APPLICATION

The sole inventor of application Ser. No. 15/819,614, filed Nov. 21, 2017, was granted U.S. Pat. No. 10,198,747 on Feb. 5, 2019, whereas Section 102(b)(1)(A) provides an exception for a "grace period inventor disclosure," which is a disclosure made by an inventor within one year before the new application was filed.

BACKGROUND OF THE INVENTION

The present invention relates a voice user interface (VUI) and, more particularly, to methods used to advertise and market products and services on a digital content platform (DCP)

Today, in addition to allowing advertisers, ad networks, data aggregators, and ad exchanges to view and manage data regarding users' interactions with their content, a digital content platforms (DCP) often stores information about users to target advertising. As a result, systems and methods are not readily available for users to manage advertising preferences globally, or initiate a consumer global policy that limits targeted advertising to companies that may share consumer data with third parties. In order to gain control of their data, users typically must visit the privacy policy pages of a number of ad networks, understand each network's policies, and opt-out to each of them, individually, by locating the 'opt out link' on each DCP. In addition, simply finding out which ad networks and companies are responsible for the advertising is problematic. Even though advocates and regulators exert pressure on companies to expose to users exactly what they know about them, and provide a way to add, delete, and edit that information, users still have to visit each of those companies' website separately to perform these actions. Moreover, the consumer's opt-out status (or other targeting preferences) must be known with regard to a particular content network or ad network, and/or tracking system in order to accurately implement and monitor online behavioral advertising guidelines. As a result, 88 percent of US adults believe it is important to know how their data is shared. (ADWEEK, Jan. 6, 2020)

In the past, advertisers resorted to gut feeling or best guesses when planning and forecasting their media buys. After all, predicting consumer behavior has never been an exact science while the availability of more devices and interactions add to the difficulty of accurate predictions and planning. The proponents of artificial intelligence (AI) cloud advertising, however, claim it successfully allocates advertising budgets across search, display and television by finding patterns in huge volumes of data. AI uses simulations to gauge how changes in budgets or goals affect an advertiser's performance and provides budget recommendation. AI improves forecasting and planning for ad channels without diverting campaign development resources. Simulations allow marketers to see how budget changes affect predicted outcomes before they commit to a total ad budget. AI considers all available data like site engagement, conversion and dimensional data, which includes audience, device and location, along with search engine and campaign settings to determine the right bid amount and budget allocation to most efficiently meet an advertiser's objectives. Additionally, AI adds a degree of confidence and accuracy to linear national TV plans as, typically, planning is based on predicted viewership behavior. Yet, despite the benefits of artificial intelligence for advertises, which may facilitate the efficiencies of programmatic and real-time buying, it is highly unlikely that AI will improve user satisfaction. According to The New York Times (Oct. 28, 2019), "The Advertising Industry Has a Problem: People Hate Ads." Joanna Coles, the former chief content officer of Hearst Magazines, said, "And it's all advertisers' fault. People hate advertising." And Marc Pritchard, the chief brand officer at Procter & Gamble, one of the largest advertisers in the world, agreed, "Ads are often irrelevant and sometimes just silly, ridiculous or stupid." As a result, the industry faces an "existential need for change," according to a blunt report published by the research firm Forrester. "Now the agencies must disassemble what remains of their outmoded model, or risk falling further into irrelevance," the report concludes. Today, 91 percent of customers say ads are more intrusive than ever. In the UK, only 11 percent of the population surveyed say they like advertising. Fifty percent of customers globally use an ad blocker. (HotSpot, Digital Information World, 2019)

Television ad-skipping has become a common practice. Viewers switch channels with remote controls and fast-forward through TV spots with the digital video recorder (DVR). Because advertising is a primary revenue for basic TV networks (unlike subscription services), ad-skipping concerns television content providers. Video on demand (VOD) and video streaming on computers and mobile devices, fragments TV viewership and further erodes ad-supported models.

Basically, findings show that users don't accept advertising and tracking because they don't mind; they accept it grudgingly because they don't know how to avoid it, though they dislike it even more than they do spying by government agencies that prompted a series of national scandals (Pew Research Center). In fact, recent user backlash against ads has been so severe that the Interactive Advertising Bureau recently issued an apology.

Today, information from patents can be used to reveal different trends and emerging areas related to web based targeted advertisements. The analysis of the patenting activity reveal that advertisements are targeted based on various criteria such as user profile, user location, events/environments, etc. that are related to user. Although most of the web based technologies are generalized for wide range of products and services, there also exist specific web based targeting advertising related to travel related products/services, banking, insurance and automobiles. Examples of patents granted for online targeted advertising include managing and monitoring digital advertising U.S. Pat. No. 9,361,631 B2, which excludes the consumer inasmuch as this invention relates to methods and systems for tracking how advertisers, ad networks, ad delivery systems, content publishers, and other members of an advertising ecosystem deliver advertising content to users. Further, the prior art systematically eliminates consumer control of advertising through a large range of patented permutations, including targeting online ads based on political demographics U.S. Pat. No. 8,763,033 B2; a method for targeted advertising on the DCP based on accumulated self-learning data, clustering users and semantic node graph techniques U.S. Pat. No. 6,714,975 B1; Internet advertising with controlled and timed display of ad content from centralized system controller U.S. Pat. No. 6,128,651; Targeted television advertisements selected on the basis of an online user profile and presented with television programs or channels related to that profile U.S. Pat. No. 8,607,267 B2. Patent US 20100086107 A1 is an example for online targeted advertising which include users of an end-user device that employs a VUI to retrieve ads from a server.

Currently, there are patents that employ a VUI for targeting advertisements to a user on an end-user device based on speech recognition processing performed on the user's verbal communications. The automated system and method for targeting advertisements utilizes speech-recognition that is performed on the device or on a network (e.g., on a voice switch), feeding an ad-serving infrastructure (together with additional data), and relaying the advertisement that has been determined for the user to a client-side application residing on the end-user device. The advertisement may comprise textual information, graphical information and/or audio information (e.g., human speech and/or music).

While a VUI may facilitate ease of operation for a DCP, there are concerns regarding new patent applications for Amazon Echo and Google Home which show that smart devices can target moments in between screen time to monitor, 'Black Mirror' style, as to reveal the personal private activities and habits of the user. Access to this data can flesh out profiles of users in order to help these devices more accurately target advertising.

The California Consumer Privacy Act (CCPA), effective Jan. 1, 2020, intends to enhance privacy rights and consumer protection for residents of California, although technology companies have launched media campaigns and hired lobbying groups to counter that the act is not consumer-friendly. A well-known lobbying group, the Internet Association, encourages consumers to push for Ad Tech exemptions, alleging that, without the revenue garnered from targeting advertising, technology companies will be forced to pass on the increased costs to Internet users.

From a business perspective, in 2019, the total worldwide digital spend rose by 17.6 percent to $333 billion, with revenues of $104 billion for Google and Facebook at $70 billion, resulting in a digital advertising ecosystem that vastly favors the duopoly. They set the rules and use undue influence. Publishers and marketers alike reinforce the walled gardens of these duopolies, enabling the continued growth of these two companies, while simultaneously eroding their own revenue and ability to compete.

BRIEF SUMMARY OF THE INVENTION

The present invention relates a voice user interface (VUI) on a digital content platform (DCP), and, more particularly, how the VUI is utilized to grant users total control of the display of advertising across advertising supported digital content platforms, thereby eliminating, upon user discretion, unwarranted and intrusive advertising while deriving the benefits of targeted advertising based on permission-based personally identifiable information (PII). However, the claimed Voice User Interface (VUI) solution of the present invention, which grants user control of the display of advertising with simple user commands such as, "Display ads," and subsequently, "Remove ads," is necessarily rooted in computer technology in order to overcome the difficulty consumers face specifically arising in the realm of computer networks, whereas systems and methods for users to manage advertising preferences globally are not readily available. To address this need, the present invention provides a secure, scalable approach to provide consumers the VUI for global control of the display of advertising across the entire digital advertising ecosystem, without tying up the judicial exception, as the claims do not wholly pre-empt the field and post no risk of pre-emption, because, as enumerated herein, non-infringing alternatives are significant and substantial. However, while many advertising ecosystem entities currently use the Network Advertising Initiative's ("NAI") opt-out tool, which uses a HTTP redirect mechanism to identify opt-out status, the architecture and methods of the present invention provide a more secure and scalable standard for any service provider to operate with entities that store data about users and their ad targeting preferences.

Also described herein is a computer program product comprising a computer-readable medium having computer program logic recorded thereon for enabling a processor to perform speech-recognition on the user's verbal communication (performed either on the end-user device or in the voice-communication network), integrated with a second computer program responsible for selecting ads based on business logic, taking as inputs user data (e.g., past interaction, geographical location), as well as the result of speech recognition performed on the voice communications. Also described herein is a computer program residing on the end-user device that integrates with the second computer program mentioned above, receiving ads that were determined to be displayed or made available to the user.

Total user control of the display of advertising on ad-supported content platforms will undoubtedly satisfy users, while, at the time of the invention, to those of ordinary skill in the relevant art, it belied the very definition of advertising, as "the act or practice of calling public attention to one's product, service, need, etc., especially by paid announcements in various media."

Further, at the time of the invention, granting consumers total control of the display of advertising would have been nonobvious to one having ordinary skill in the relevant art, as informing users that choosing not to display ads while still granting users unconditional access to all digital content on the platform, would be antithetical to the advertising industry as a whole. In fact, according to the "The Importance of Being Seen: Viewability and Brands," brand marketers since the "Mad Men" era have often sought insight to a simple question: Was my ad seen?

In accordance with the present invention, the primary problems of the prior art are solved when independent publishers grant users control of when and how often all advertisements and commercial messages are displayed on their platforms. These publishers, comprising the third-party ecosystem, arguably offer the same data, scale and capabilities, but are broadly fragmented across partners, technology platforms, and content landscapes. To this end, a preferred embodiment of the present invention propagates the independent DCP ecosystem, through cloud computing, with targeted, user-centric advertising cohorts. Another embodiment proposes a commercially branded online network of ad-supported content that collectively grant user control over the display of marketing assets across all platforms that have licensed the present invention, without restriction to ad-supported digital content. This non-transitory computer-readable media method gives advertisers access to user databases of favorite merchandise and e-commerce opportunities on myriad digital devices simultaneously, with persona-based targeted ads that are relevant to users and much less invasive, in comparison to current advertising methods.

DETAILED DESCRIPTION OF THE INVENTION

Figure 1:
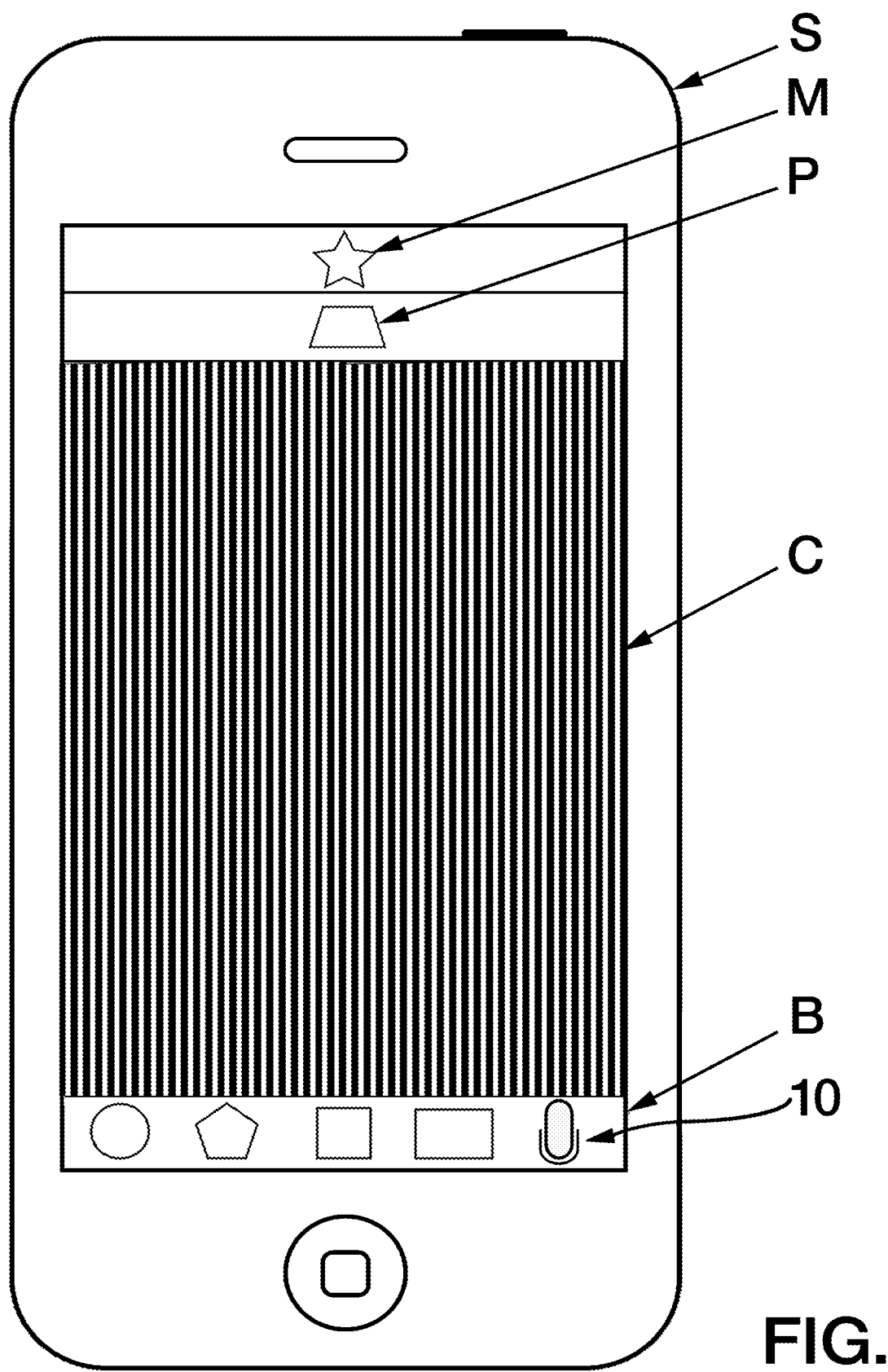
FIG. 1 is a depiction of a mobile phone to illustrate exemplary user advertising control method.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

The term "digital content platform" may be a platform on a personal computer, a desktop computer, a mobile computer, a laptop computer, a set-top box, a notebook computer, a tablet computer, a personal digital assistant (PDA), a mobile phone, cable modem and Internet-ready televisions, or any other suitable digital content device. Typically, a computer includes or is operatively connected to means for connecting the computer to another computer via a network, for example, the Internet.

Specific details are set forth in the following description in order to provide a thorough understanding of the invention. For the purpose of clarity, however, digital technology that is known in fields of voice user interfaces, digital advertising and interactive media related to the invention has not been described in detail so that the present invention is not unnecessarily obscured.

Although embodiments of the invention are not limited in this regard, discussions utilizing terms such as, for example, "processing," "computing," "calculating," "determining," "establishing," "analyzing," "checking," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Unless explicitly stated, the method embodiments described herein are not constrained to a particular order or sequence. Additionally, some of the described method embodiments or elements thereof can occur or be performed at the same point in time.

The term "opt out" used in this patent application specification should be expansively and broadly construed to include any blocking, avoiding or otherwise preventing a serving, reception and/or acceptance of digital content. The terms opt out, blocking, preventing or avoiding may be used interchangeably in this patent application specification.

The term "opt in" used in this patent application specification should be expansively and broadly construed to include any allowing, permitting or otherwise enabling a serving, reception and/or acceptance of digital content. The terms opt in, allowing, permitting or enabling may be used interchangeably in this patent application specification.

Therefore, without being bound by theory, or limited by lack of precise jargon, the description of the invention below is intended to be understood as being operable in the context of known means for operating a personal computer, a desktop computer, a mobile computer, a laptop computer, a set-top box, a notebook computer, a tablet computer, a personal digital assistant (PDA), mobile phone, cable modem and Internet-ready televisions, or any other suitable digital content device, and as currently used, but lacking in the inventive features of the present invention.

According to broad industry consensus, technological advances in the new millennium have yet to benefit ad-supported digital advertising.

The present invention improves upon the delivery, participation, satisfaction and profitability of the prior art through a method that represents the interests of three interdependent constituencies simultaneously: 1) The advertiser and e-commerce marketer of products and services; 2) The ad-supported content provider on digital media platforms, and 3) The user, e.g., the majority of online demographic and socioeconomic groups.

An embodiment of the present invention may apply multimodal interactions of the VUI and a Graphical User Interface (GUI) to a DCP, as a means to render the interfaces natural and efficient, with parallel and meaningful use of the input and output modalities. Each system offers an interface that requests the DCP system to respond to functionality the user initiated, i.e., voice commands, such as "Display ads" and "Remove ads," or the tactility of touch, i.e., tap, click, etc., of the GUI, resulting in the action "on" to display advertisements, and the subsequent action "off" to remove ads, as examples of the GUI on a DCP to display and, subsequently, remove ads.

The multimodal systems may combine user input modes, such as speech (VUI) and touch (GUI) in a coordinated manner, or as single interfaces that perform globally on the digital content platforms, including mobile phones and tablets, desk and laptop computers, and cable modem and Internet-ready televisions, whereas each display a visual affordance; i.e., a "microphone" VUI icon prompt, and a permanently displayed GUI icon, which may embody the DCP design "stylebook" and tech requirements.

An embodiment of the present invention is a client system graphical user interface GUI, which may be permanently displayed which does not constitute "advertising" as persons having ordinary skill in the art recognize the long established and unambiguous differences between graphical user interfaces and the advertising of goods and services.

User control of advertisements will help alleviate the misuse of information collected by RTB operations and the risks associated with online exposure of personal information. The present invention replaces information inferred by online activities, demographic data, and invasions of privacy, relying instead on permission-based marketing and the myriad inducements it produces to prompt user engagement of advertising messages, as well as improved return on investment for content publishers and advertisers worldwide.

According to embodiments of the invention, it runs in a client/server environment, whereas a client computer contacts a server, which provides services to the client computer. These services mitigate the primary user objection to the prior art when content providers grant users control of the quality and relevance of ads for preferred products and services, and when and how often these ads are displayed. A preferred embodiment for user control of all advertisements on digital media platforms comprises a method wherein digital media platforms do not display any advertisements; however, they do display a voice input trigger, in the form of an icon, i.e., a "microphone," whereas the user will utter a verbal command, i.e., "Display ads," that will prompt the DCP to begin processing the speech to display advertisements, as those skilled in the relevant art and in response to only the indicated single voice command being uttered, the user sends to a server system a request to display advertisements. In addition, the same voice input trigger graphic may be initiated by the user on the DCP displaying advertisements to utter a verbal command, i.e., "Remove ads," whereas all such advertisements will be removed globally, and in response to only the indicated single action being performed, the user sends to a server system a request to remove the all advertisements.

Another preferred embodiment links user-centric advertising to the Personally Identifiable Information (PII) by performing Big Data analytics. For example, a person's purchase data (e.g., from credit cards, customer loyalty cards, and the like), media consumption data (e.g., TV viewing data, Internet media streaming data, iTunes media data), web browsing data, tax filing data, social network data, calendar data, e-mail data, Twitter data, geo-location data, travel history, photo data, medical data, criminal record data, DNA data, employment data, and the like can be analyzed determine a person's interests and objectives. Based on this analytics, a user-centric, permission-based advertising profile can be generated. However, digital content providers lack easy ways of offering transparency to users regarding how personal data is processed, even if their intentions are to make their platforms more privacy friendly. To address these challenges, the present invention offers user control of the display of advertising, leaving the user with the option of deleting their profile at any time.

In view of the foregoing, a non-transitory computer readable storage method is provided for determining, among other steps, a match between a user and advertising preferences, based on a personal profile, to generate user-centric marketing information. Further, a preferred embodiment of the non-transitory computer-readable medium includes executable instructions that when executed by a processor cause the processor to effectuate a method. This method may include obtaining raw data from a plurality of different data sources; analyzing the raw data to identify one or more data structures of the raw data and to tag data identifying at least one of the plurality of different data sources; generating a plurality of Universal Data Model (UDM) constructs, each UDM construct being based at least in part on the one or more data structures of the raw data and each UDM construct excluding the source-identifying data. Because the claims recite a "non-transitory" computer-readable method, which addresses a potential 35 U.S.C. § 101 rejection, the applicant respectfully submits that a "non-transitory" computer-readable method comprises all computer-readable media, with the sole exception being a transitory, propagating signal, i.e., register memory, processor cache and RAM. The present invention is a computer-implemented method for granting a user control of the display of advertising on DCP. The DCP receives, at a server, a user request, initiated by a verbal VUI command, to "display ads" on the DCP. The DCP requests from the server automated analytic access to big data, which retrieves the user's personally identifiable information (PII) and displays user-centric advertisements on the DCP from a plurality of ad-serving networks. The user may initiate a verbal command to the VUI to "remove ads" on the DCP, which requests from the server to remove the display of any advertisements on the DCP. The inventive matter applies big data analytics to the user PII profile, and sorts the profile based on user-centric insights, matching these insights with ad-serving networks, and thereby displays on the DCP user-centric advertisements. Further, the method continuously monitors the DCP for a verbal command to the VUI. When the VUI receives a verbal command, an indication of a user verbal recognition is requested and the recognized verbal command is scanned for one or more key phrases, which initiates a connection between the DCP and a system if a key phrase is detected. The verbal command is passed, or appropriate feature parameters extracted from the verbal command, from the DCP to the system for interpretation, for either acceptance or rejection of the proposition. When granted, upon acceptance, the DCP access to the PII of user correlates user-centric insights with ad-serving networks.

Due to poor user acceptance of advertising, marketers are actively reinventing the customer experience through VUI. A typical VUI is implemented using various techniques which enable an electronic device to "understand" particular words or key phrases spoken by the human user, and to output or "speak" the same or different words/phrases for prompting, or responding to, the user. The words or phrases understood and/or spoken by a device constitute its "vocabulary." In general, the number of words/phrases within a device's vocabulary is directly related to the computing power which supports its VUI. Thus, a device with more computing power can understand more words or phrases than a device with less computing power. The present invention may handle such user interactions, including the voice and natural language recognition, and works with vocabulary input modalities to handle key phrases, user requests, such as "Display preferred clothing brands." "Remove clothing brands and display vacation rental properties." "Display local 'Open Table' restaurants." "Show British Air booking landing page." "Show last month's purchases."

Behavioral advertising is consigned to real-time buying (RTB), one ad network alone can hyper-target as many as 12 billion ad impressions daily, which, as previously noted, may only serve to elevate user resentment and ad avoidance. The nation's largest media and marketing trade associations, with support from the Council of Better Business Bureaus, have met for years to promote self-regulatory approaches to the collection of data used to drive behavioral ad models. However, as the prior art has shown, data collection is not the problem, but rather the frequency, relevance and quality of the ads that metadata provokes. The inventive matter herein empowers users to leverage their personal data against elective ad views of preselected, favorite brands, qualifying ad delivery, which, as an intended result, improves advertiser and content publisher return on investment.

Another embodiment of the invention may employ a permission-based marketing method in a Real Time environment, inserting on digital content platforms on a plurality of computers in real time on an impression basis. When a user has accessed the VUI to display advertising, advertisements start an online process to determine which product attributes best match the user-centric profile. A preferred embodiment of the invention is the intersection of a Real Time environment, PII, and user control of all advertisements on content provider platforms, which solves a major obstacle faced by advertisers trying to deliver highly targeted and customized marketing to receptive audiences. The difficulty of gathering and activating relevant, timely and accurate user information from diverse and often inconsistent sources is eliminated, because the present invention performs highly accurate entity resolution using that PII, and returns one or many requested data bundle enhancements associated with that PII—all in a single Application Programming Interface (API) call.

A preferred embodiment of the invention employs a permission-based marketing method that incentivizes users to view advertisements, for which digital content providers have obtained permission from users to source highly accurate personal information regarding their preferred products and services at relevant price points. Derived from commercial databases that practice enterprise data mining and analytics, user information is retrieved, via access permissions, from servers that can process trillions of data "transactions" a year, for each of an estimated 2.2 billion customers around the world, with detailed information on 96 percent of Americans. The present invention relies on user-centric data to offer the relevancy of user brands and band introductions that may be of interest to the user, while respecting the privacy of users by offering the ability to control the display of all ads with the single verbal command to the VUI. In regard to the user data of the present invention, it comes from three different sources: (1) government records, public records and publicly available data, (2) self-reported data, and 3) data from other commercial entities where users have been provided notice of how their data will be used, and offered a choice about whether or not to allow those uses. The data includes public record and publicly available data from such sources as telephone directories, content platform directories and postings, real property recorder and assessor files, and government licenses. Data from other providers includes demographic data, surveys and questionnaires, and summarized or aggregated purchase data. As a result, the present invention provides users with more relevant advertising, better service, improved offerings and special promotions, for online and mobile targeting and content platform personalization. Opting out will reduce the relevance of offers users receive from companies with which they have done business. Sensitive data such as social security numbers and driver's license numbers are not included. Personally identifiable information about children younger than 18 will be screened out. However, the presence of children in a household by age ranges is included. PII includes Individual data name, address, telephone number, email address, gender, education level, occupation, voter party, ethnic code/language preference, Age in two-year increments, date of birth Note: Ethnic code/language preference is derived from last name or comes from a survey a user has completed. Full date of birth is only provided in limited instances and for specific purposes, such as life insurance marketing. Typically, only age or year or month/year is used. Household demographics adult age ranges, children's age ranges, number of adults and number of children in the household, marital status, household interests, interest categories include reading, food/cooking, travel, exercise, health/self-improvement, hobbies, pets, sports, collectibles, investments, computers, electronics, home improvement, games/contests, photography, etc. Note: These variables are obtained from surveys a user or someone in a user's household completed or are derived from inquiries or purchases a user has made. A household can have multiple characteristics. household purchase, behavior purchase indicators and characteristics include frequency of purchase indicator, types of purchases indicators, retail and mail-order buyer indicators, charitable giving indicator, community involvement indicator, media channel usage indicator, buying channel preferences, average direct mail purchase amount, direct mail frequency indicator, types of stores indicator. Note: Types of purchases indicator includes such categories as apparel, home improvements, books, computers/electronics and small appliances. Types of stores indicator includes standard retail, specialty and upscale. household life event data new parent, expectant parents, new teen driver, college graduate, empty nester, new mover, recent home buyer, recent mortgage borrower, getting married, divorced, child leaving home, buying a new car Note: This data, for example, is obtained from self-reported surveys or derived from public records. Within the scope of the present invention, this information informs the relevancy of highly targeted advertisements on digital media platforms.

An improvement in the field, the inventive matter includes a non-transitory computer readable storage method that grants users control of RTB behavioral advertising as well as the ads that result from permission-based marketing, such as PII API data.

In the prior art, permission-based marketing is synonymous with opt-in emails, which are primarily ads for products and services, i.e., spam, with an "unsubscribe" user option once the email is received. In essence, the only permission granted by marketers is to opt out after receiving unsolicited emails from reportedly legitimate lists that reportedly "blast" as many as 30 million "opt in" emails at one time.

The concept that well-structured directed dialogue strategies may out-perform natural language free-form interactions was realized by speech technology vendors during the early and mid-1990s. The development of a spoken dialogue market during those years led to the rise, in the late 1990s, of a well-structured industry of speech engines, platforms and tool vendors, application developers, and hosting companies, together with increased attention to the industrial standard. In fact, several standards have governed the speech industry, including, among others, VoiceXML, CCXML, SRGS and SSML. In regard to the present invention, however, one of ordinary skill in the relevant art may advocate the adoption of a more pragmatic approach, whereas each interaction is practically designed in minimal details through the VUI.

The nonobviousness of the present invention informs users of the benefits of engagement with a DCP through the value proposition dialog box. A preferred embodiment, the value proposition dialog box may display a VUI "microphone" icon and written steps that prompt user recitation of verbal commands, such as "Display ads," and, subsequently, "Remove ads," thereby granting users total control of the display advertising on the DCP. Further, spoken prompts on the DCP may instruct users to repeat verbal commands, such as "Display ads," and, subsequently, "Remove ads," whereas the written and voice directed VUI prompts are both well-structured and readily implementable concepts to one of ordinary skill in the relevant art. Moreover, upon user acceptance of the value proposition, the DCP can source highly accurate personal information of users, regarding their preferred products and services at relevant price points, and display preferred advertisements on the DCP.

Digital marketers have unleashed powerful and far-reaching data collection, profiling, and targeting technologies online, incorporating the latest developments in such fields as semantics, artificial intelligence, auction theory, social network analysis, data mining, and neuroscience. Consumers and policymakers, however, are largely unaware of how online advertising operates nor are they prepared to assess the impact of tracking technologies that monitor user travels on the Internet and generate information for digital targeting profiles. Unlike more traditional advertising, digital marketing watch users, relying on such techniques as data optimization, "self-tuning" algorithms, "intent" data, and "immersive" multimedia to enable personalized, highly targeted marketing. Such marketing has also been integrated into the core business models of social networks, mobile communications, gaming platforms, virtual worlds, and online video. With the repeated failure of industry self-regulation, strong privacy safeguards can only come with total consumer control of the display advertisement on digital content platforms, including provisions that apprise consumers of the privacy benefits of the present invention.

According to embodiments of the invention, choosing the value proposition gives the DCP permission to access user PII, derived from enterprise data, for the express purpose of providing user with advertisements for preferred brands as well as advertisements for brands, which data has indicated, may be of interest to user. A user may choose to reject the value proposition, whereas the DCP would be denied permission to access the PII. However, users will still have unconditional access to all the digital media on said DCP, and will not be required to perform any additional actions. An example of the value proposition may be, in all or part of, the following:

When you opt in to [DCP], you stay connected to all [DCP] has to offer while you decide when and how often you want to view ads.

Now, simply say, "Display ads," and you'll see updates and opportunities from your favorite brands. If you agree to display ads, your personal information links you to a world of savings while you bank [DCP] virtual dollars. Spend them on your favorite stuff. Buy gifts and save up for big purchases. Tap the product logos, and you could win great prizes and rewards on the spot!

At any time, say, "Remove ads," and all advertisements, including DCP access to your personal info, will be removed. But you'll still enjoy [DCP] without seeing ads at all. (Although you won't know what you're missing!)

Whether user VUI commands are written or spoken communication, either prompt may include, but are not limited to, "Display ads," Remove ads," "Display advertisements," "Remove advertisements," "Put on ads," "Take off ads," "Exhibit advertisements," "Withdraw advertisements," etc. Regardless of the voice commands presented herein, the VUI is designed to adapt to a user's individual preferences over time and personalize results. Initially, the simple "display" and "remove" verbal commands, or any variations thereof, are sequential, inasmuch as they are a natural selection, as the first command, to "display" flows to a second sequence "remove," ergo, the precise jargon, initially, may not be precisely pared or stipulated, as these action are logical, e.g., performed by rote. However, the present invention VUI vocabulary may expand to include product categories, the brand names of products and services, or any other marketer's reference point, which may be retrieved auditorily and visually represented by GUI, and therefore ascribe to the aforementioned multi-modal interactions. Multi-modal interactions reflect a natural and efficient parallel which are a meaningful use of the input and output modalities, as VUI may instruct user to navigate the GUI to display and remove the aforementioned specific products and services, within the global display of the inventive matter. Further, the VUI may speak and understand English (Australia, Canada, India, New Zealand, Singapore, UK, US), Spanish, French, German, Italian, Japanese, Korean, Mandarin, Norwegian, Cantonese, Swedish, Danish, Dutch, Russian, Turkish, Thai and Portuguese. Both GUI and VUI would conform to the design elements of the DCP, e.g. top or bottom of screen, on a menu bar, and be of any typography, color, size, shape, or style, and may be iconographic by design, a VUI "microphone," "human ear," "bullhorn," etc.

The permission-based embodiment incentivizes users to view ads on a DCP that has obtained user permission to source highly accurate personal information pinpointing favorite brands. In this regard, permission-based marketing becomes precision-based marketing, inasmuch as a user may choose to view ads for preselected merchandise.

The aforementioned preferred embodiment grants users the opportunity to view the content on an ad-supported DCP without the presence of ads. The present invention places the onus on the inventive matter described herein, in association with content providers and the advertising community, to make advertising as welcome, compelling, and value-added to the user as the content it supports.

Regarding privacy concerns, privacy proponents emphasize that there's no safe, foolproof way to implement encryption backdoors. Despite repeated promises to its billions of users worldwide that they could control how their personal information is shared, Facebook undermined consumers' choices. Although the FTC imposed $5 billion penalty and new privacy restrictions on Facebook, legislation requiring companies to obtain a person's permission to collect and share their sensitive data, has been postponed for the near-term, due to political considerations.

Regardless of privacy legislation that may be proposed and/or passed by Congress, the present invention assures, through a cloud environment, regulatory compliance and user-centric privacy controls which prohibit, under internal penalty, the sale or transfer of user data to any third-party database, DCP, advertiser, content publisher. Moreover, affiliated businesses and licensees will benefit from inventive privacy controls that win user trust through the prevention of human intrusion, by using automation wherever possible, for improved eCRM (electronic customer relationship management).

According to embodiments of the invention, the user advantage of granting permission is predicated on a desire to be apprised of time-sensitive opportunities regarding favorite brands, e.g., preferred coffee, paper towels, cereal, applesauce, automobiles, vacation destinations, and authors.

In accordance with the invention, an embodiment is the inclusion of e-commerce marketers on digital content platforms, offering ads with proprietary incentives that users may elect to preview prior to purchasing favorite brands. Unlike merchandizing platforms, such as Amazon and EBay, which work on predetermined shopping models, the embodiments of the invention prompt impulse buying, as users typically weigh the instant gratification of an impromptu buy on content platforms.

To promote both behavioral advertising and permission-based marketing, the invention supports advertisers and marketers that offer promotional inducements, including but not limited to sales, prizes, awards of preferred merchandise, and gamification marketing, which reflects America's interest in gaming, spending $72 billion on lottery in 2019.

A preferred embodiment of gamification is the graphical Teaser Icon (TI), which, in regard to the inventive mater of the present invention, constitutes advertising which is displayed (and subsequently removed) by user VUI verbal command, as a user engages voice control to display and remove all such advertising. In 1926, a print ad with the headline, "They Laughed When I Sat Down at the Piano but When I Started to Play" was voted by many contemporary copywriters as the best of the 20th century. It introduced the concept of how catchy headlines, arresting visuals, and punchy body copy can attract and engage readers. Ninety years later, the ad model still persists, in the form of online banner and display ads, although today's advertising professionals seek a viable creative execution that reflects both the limitations and advantages of technological advances. While advertising technology continues to flummox users, manufacturers, and content publishers, billions of ad dollars have been spent down through the years creating myriad preferred brands across all demographic and socioeconomic groups worldwide. In fact, global consumers are more likely to buy new products from familiar brands, which further validates the user impulse to view ads for favorite brands, solely at their own discretion, as described herein.

According to some embodiments of the invention, the Teaser Icon capitalizes on the minimal mobile ad space allotted to sell merchandise. Standalone teaser ads have been a staple of prior art. But on web platform landing- and sub-pages, typically an unsightly mix of competing ads and commercial messages scattered among the content, the teaser ad becomes one of many ads competing for attention. But the Teaser Icon, when chosen to appear by a consumer, is assigned to a specific, designated area within the content on digital media platforms. Teaser Icons are comprised of a series of teasers, e.g., brand logos of favorite products, a series of teaser ad headlines for said products, or a series of visual representations (such as a photograph or illustration sans written description), or any combination of teasers thereof, offering users a choice of Teaser Icons to choose from. In this regard, the gamification aspect is heightened, inasmuch as the user can pick only one Teaser Icon at a time, e.g. the game show, what's behind door number one, door number two and door number three.

The gamification embodiment includes an animated component, wherein a unified set of Teaser Icons (e.g., logos of familiar, preferred brands) continually cycle through the designated ad space. Each time the content platform is refreshed so are the teasers, which may represent either the same products and services, a series of brands, or a combination of both, prior to new data update. The inventive matter of the embodiment is substantiated by a recent global study of more than 29,000 respondents, which found that more than half (60%) of consumers around the world with Internet access prefer to buy new products from a familiar brand than switch to a new brand. Ergo, a user preference for familiar brands indicates that a logo or visual representation of a favorite brand would improve click-through and conversion rates.

Although the inventor acknowledges that the promotional vehicles enumerated in the application may be online marketing staples, they do not read on the prior art, or any combination thereof, because these promotions are subject to a series of nonobvious method steps, e.g., user control over their display without restriction to ad-supported digital content.

To further prompt e-commerce purchases, the invention includes a preferred embodiment user rewards program consisting of virtual dollars, wherein the inventive virtual dollars are defined as the markdown dollar amount of a product or service, i.e., the difference between the original retail price and the reduced price, converted into virtual dollar terms, e.g., $1.00 U.S. dollar=$1.00 Virtual Dollar. Virtual Dollars are used in combination with U.S. currency to purchase merchandise and services at the markdown price, wherein the Virtual Dollar pays the markdown, and U.S. currency pays for sale price. Virtual Dollars are accrued as an aggregate of the total markdowns offered on products and services sold at discount through participating e-commerce marketers on a content provider's DCP, whereas Virtual Dollars are disseminated to consumers to purchase said products and services.

In accordance with the invention, content platforms may elect to include a system that facilitates users to donate virtual dollars, in association with e-commerce marketers exclusively, to preapproved charitable organizations. If an e-commerce marketer elects to match a virtual dollar donation, the combined virtual dollar match will be converted to U.S. dollars and donated jointly, by the user and marketer, to preapproved charitable organizations.

In accordance with the invention, licensed content providers encourage logins by rewarding a consumer's Time-On-Platform (TOP) with virtual dollars, e.g., One Minute TOP]=$1.00 Virtual Dollar. The accrual of virtual dollars as a reward for simply logging in encourages e-commerce marketers to offer more merchandise at discount, and users to purchase it.

The inventive matter sets forth an embodiment to initiate the movement of display screen elements of content publishers across digital media platforms, as commonalities exist on all such digital devices to send to server systems a request to display ads or remove ads.

The following description of eight consecutive drawings details a preferred embodiment of the invention for DCP on mobile phones. This description is not to be taken in a limiting sense, but is made for the purpose of illustrating general principles of embodiments of the invention. A flowchart that simplifies the method is followed by drawings that cover television and computers, as a means to illustrate that the inventive matter is transferable to several digital platforms, which is followed by charts that depict the nonobviousness of ad serving methods that grant user control of all advertising, with the patent eligible limitation that user has unconditional access to the content and does not have to display of any advertising, or perform any additional actions.

FIG. 1 depicting smartphone S without visible advertisements, comprising a machine-readable storage medium having stored thereon a computer program for associating personally identifiable information (PII) with advertising intelligence, and platform content C which is in accordance with a preferred embodiment of the invention, and can be seen from 10 illustratively indicates a VUI icon, whereas the user can utter a phrase, i.e., "Display ads," that will prompt the VUI to begin processing the speech to display advertisements, based on user-centric insights derived from PII, and in response to the voice command being performed, sending to server system a request to display ads. Depicted at B VUI bar, VUI may conform to interface of DCP, e.g. top or bottom of screen, on a menu bar, and be of any typography, color, size, shape, or style of the VUI icon. (Designations smartphone S, mobile service provider logotype M, content provider logotype P, VUI bar B, do not warrant repeating in subsequent drawings).

Figure 2:
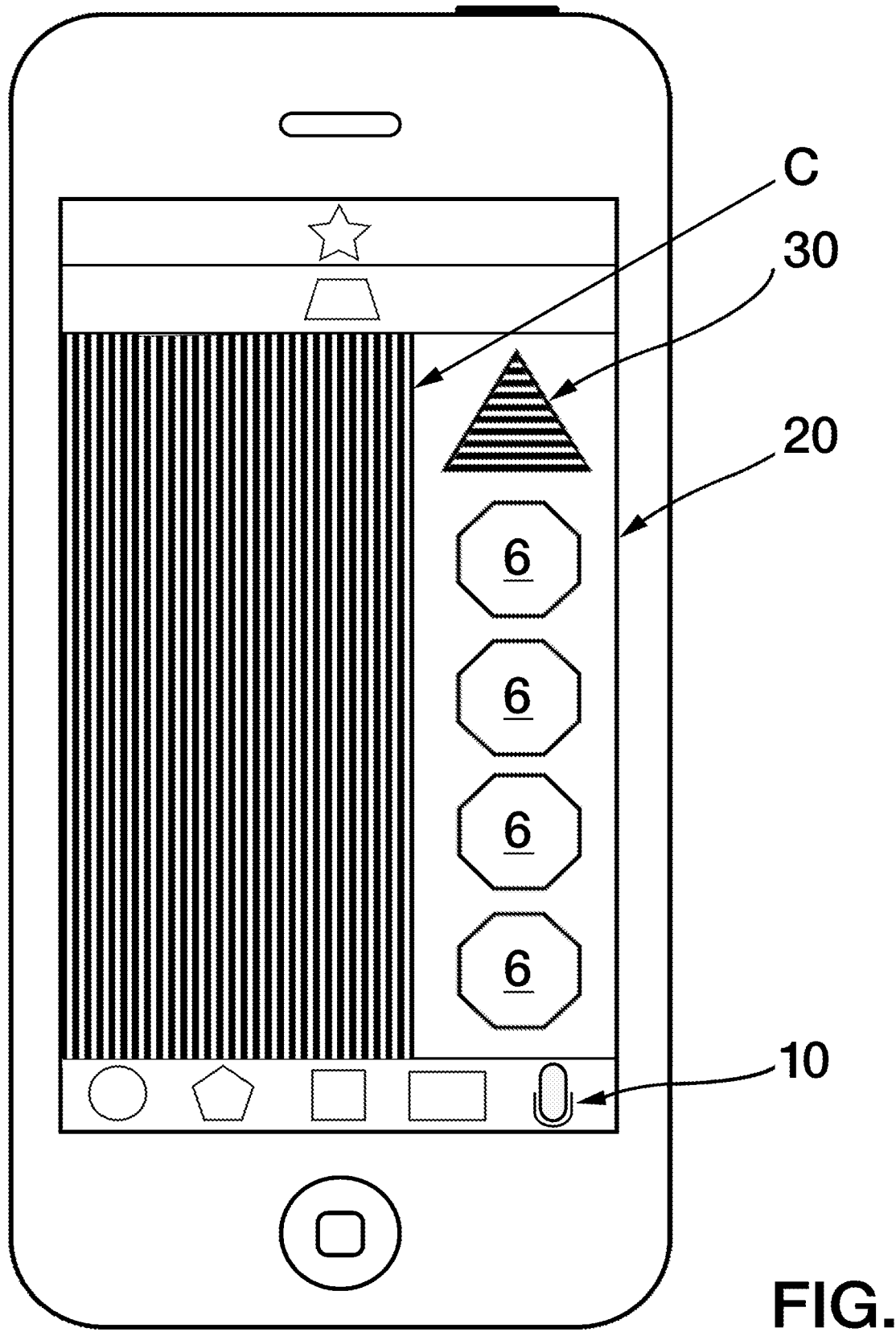
FIG. 2 is a depiction of a mobile phone illustrating an exemplary user advertising control method.
Figure 3:
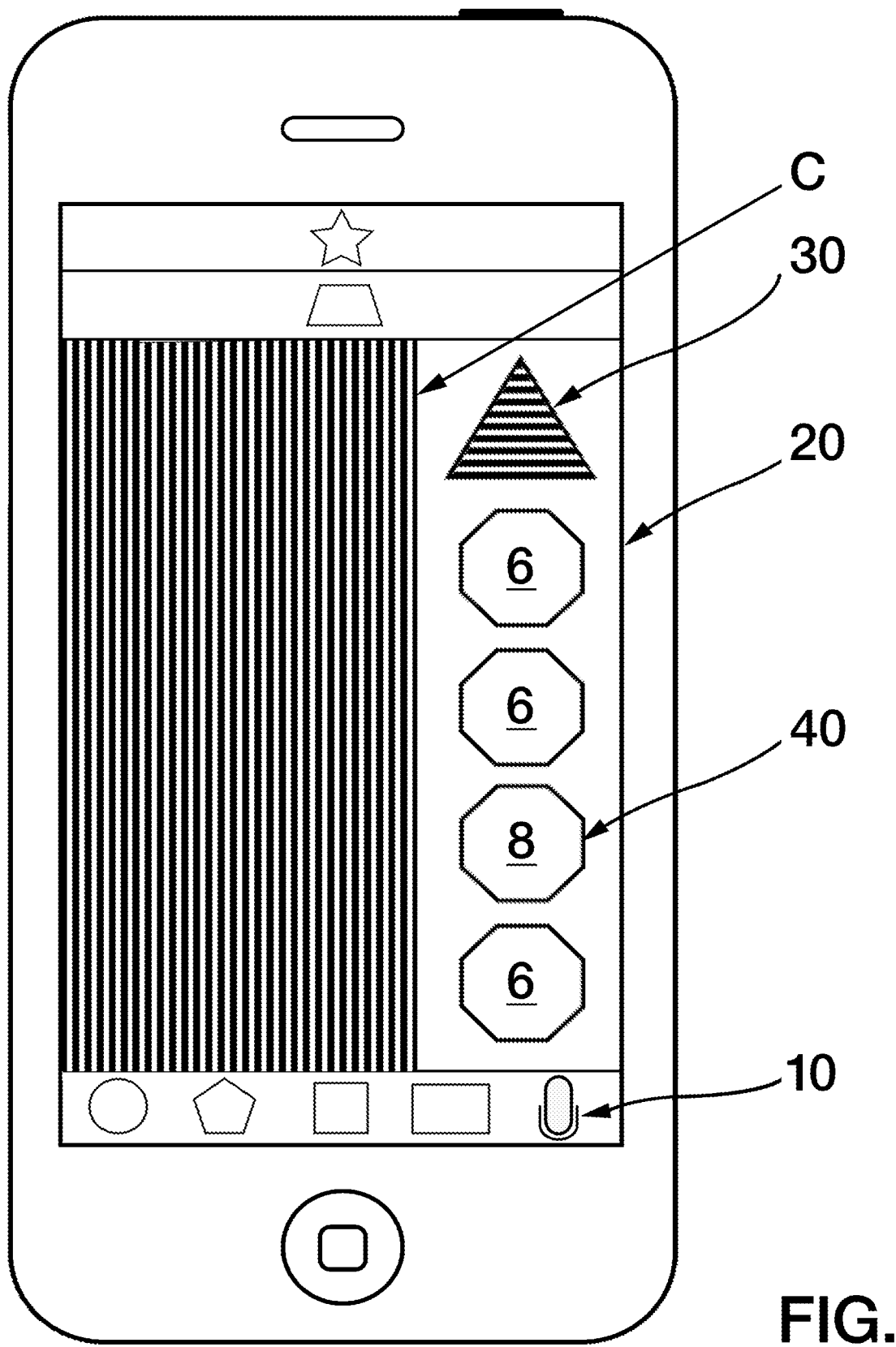
FIG. 3 is a depiction of a mobile phone to further illustrate an exemplary user advertising control.
Figure 10:
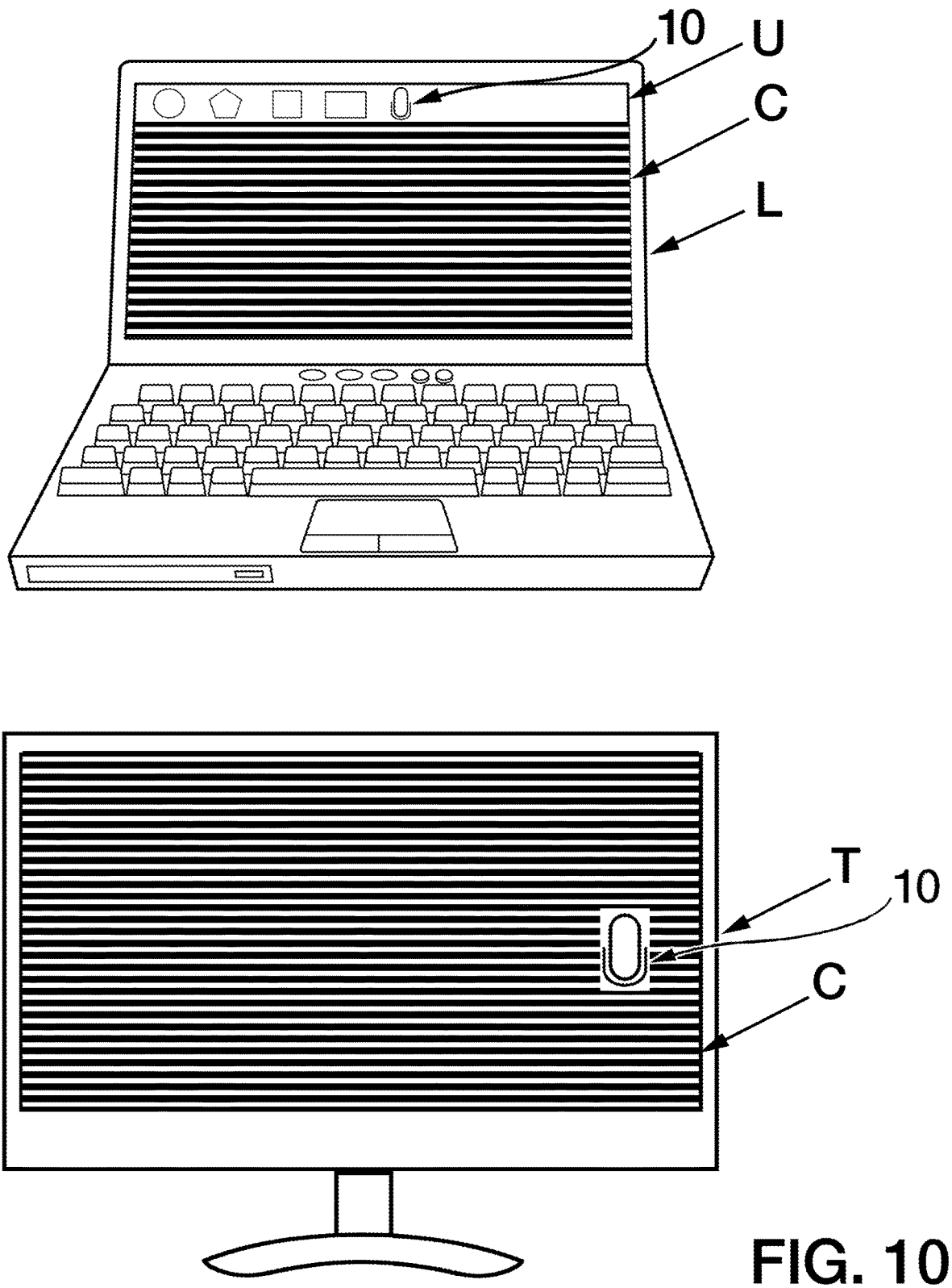
FIG. 10 is a depiction of a computer and a television illustrating an exemplary user control method.

The VUI "Display ads" FIG. 2 10 slides content C left, as content sliders have become fundamental to online content design displaying several pieces of content in one location, in which such location 20 displays the preferred embodiment advertising Teaser Icon Screen and Teaser Icons; each of which representing standalone ad teasers for favorite brands, including but not limited to logos of brands; teaser ad headlines; an assortment of photographs and illustrations as iconic visual representations of brands, or any content combination continually cycling through 20, offering users considerable variety, all of which may be collectively placed under 30, the licensed content providers "umbrella" branding element of the embodiment, e.g., logo. The variety of demographic-appropriate Teaser Icons presented to users is the crux of preferred embodiment gamification. Inasmuch as only one teaser may be tapped at a time, FIG. 3 40 exemplifies the game aspect, e.g., the game show, "what's behind door number one, door number two and door number three," which still offers user unconditional access to the content without choosing to display advertising Teaser Icon Screens and Teaser Icons, or perform any additional actions.

Figure 4:
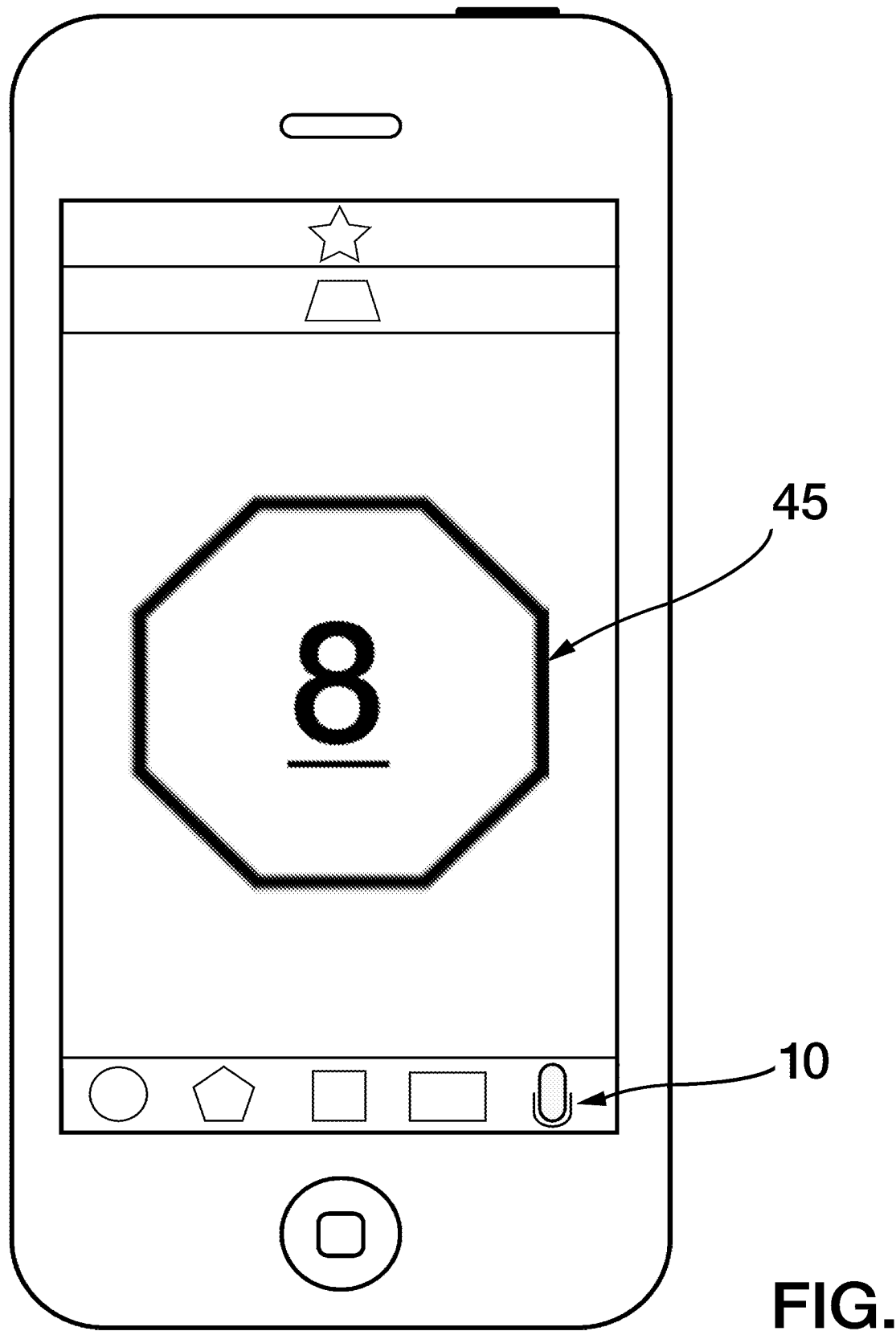
FIG. 4 is a depiction illustrating user preferred advertising introduction on a mobile phone.

FIG. 4 45 could be any number of teased outcomes, including but not limited to display ads for preferred brands, a favorite brand new product introduction, a mobile device strategy of QR and UPC barcode scans for opportune redemption of packaged goods, e-commerce impulse buying, or any marketing communications aligned with user database profile. Creative execution could embody six-second vine videos; an audio message and accompanying display ad; GPS retail location marketing; coveted merchandise literally awarded to user at location; the inventive matter virtual dollars; free movie tickets, all of which are teased then identified, as the fruition of gamification marketing described herein benefits users, content publishers, advertisers, and e-commerce marketers in equal measure, with the added user embodiments of control over the display of marketing materials, without any restriction to ad-supported digital content.

Figure 5:
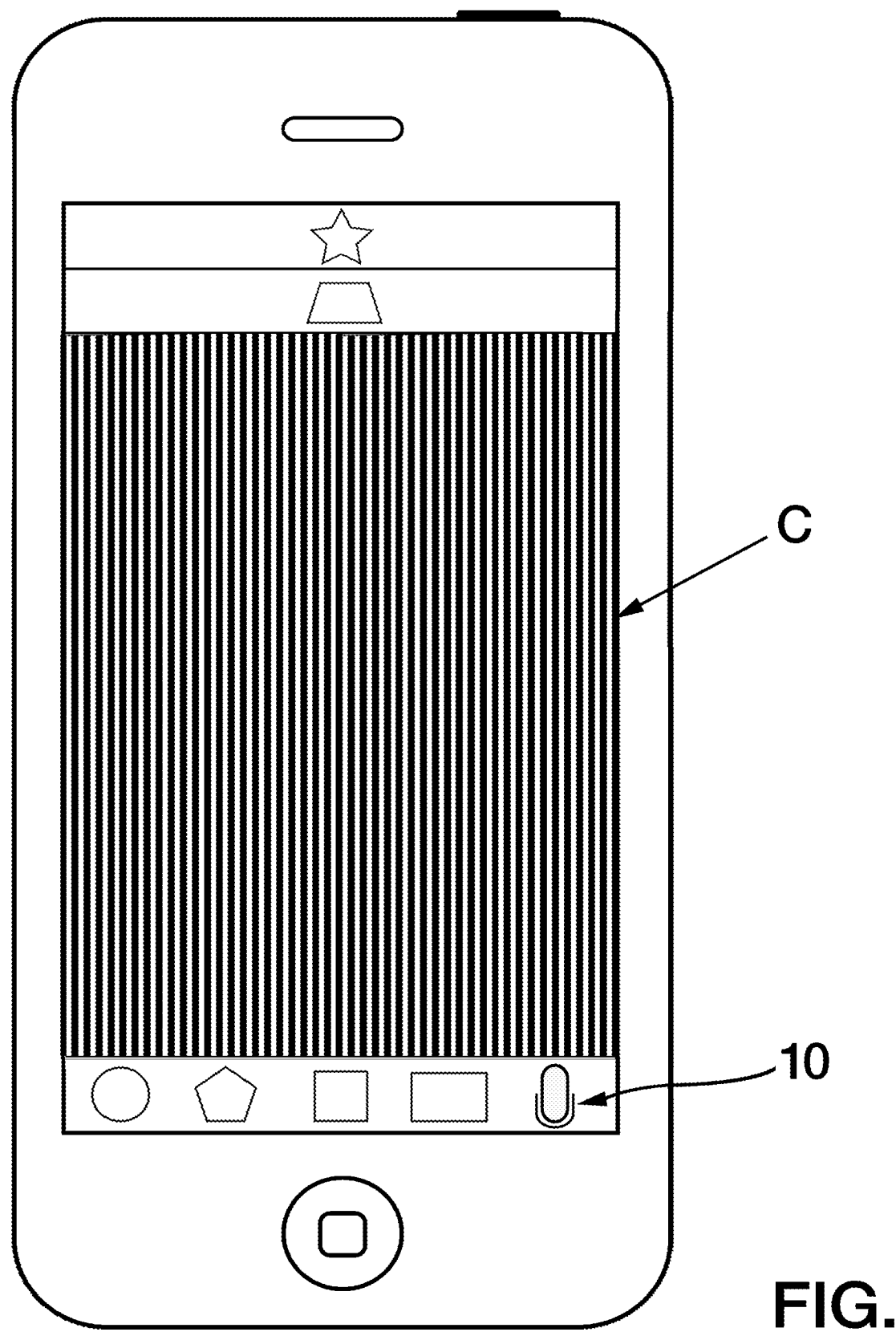
FIG. 5 is a depiction of additional inventive matter to grant user advertising control on a mobile phone.
Figure 6:
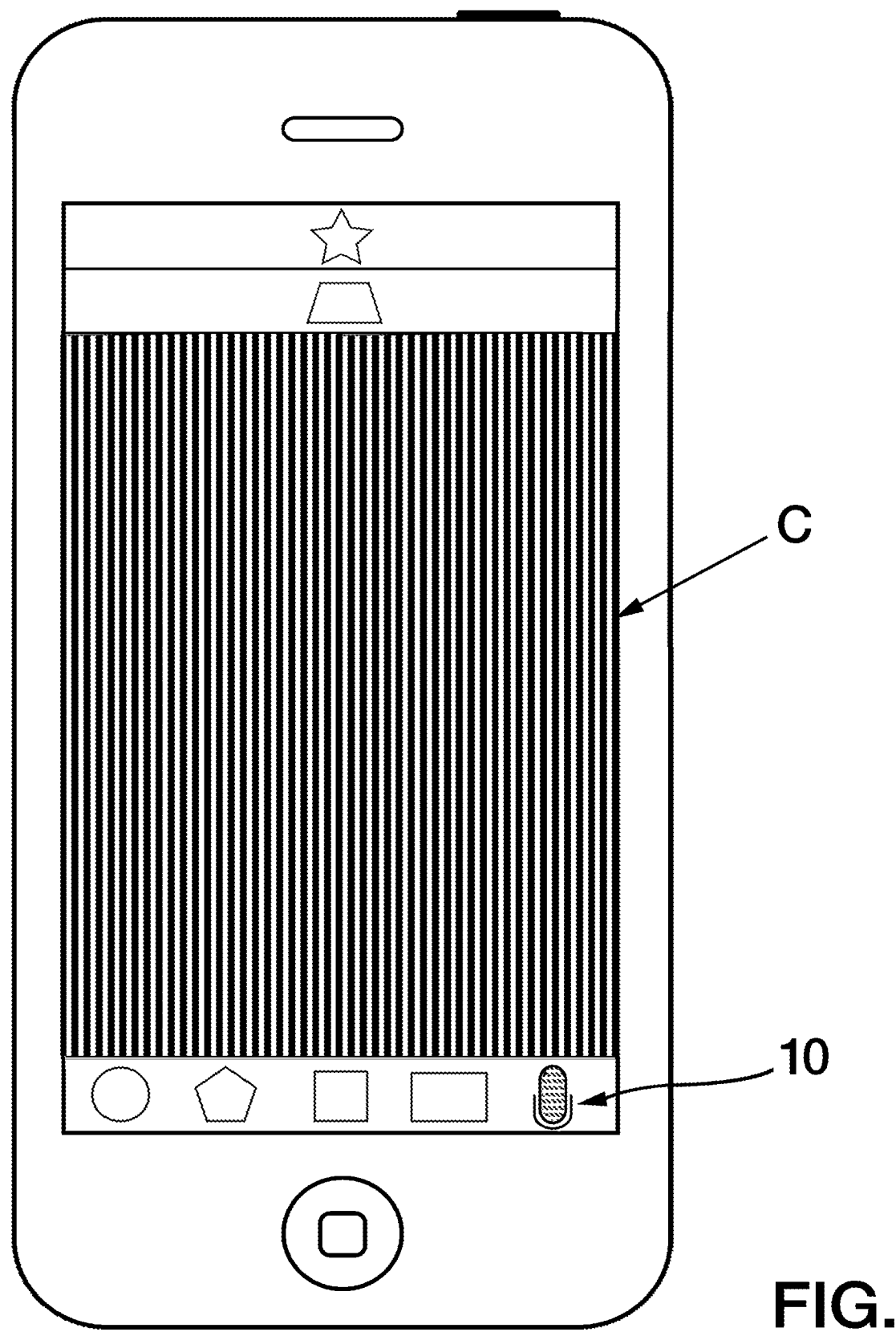
FIG. 6 is a depiction of exemplary inventive matter in regard to the introduction of preferred user advertising on a mobile phone.
Figure 7:
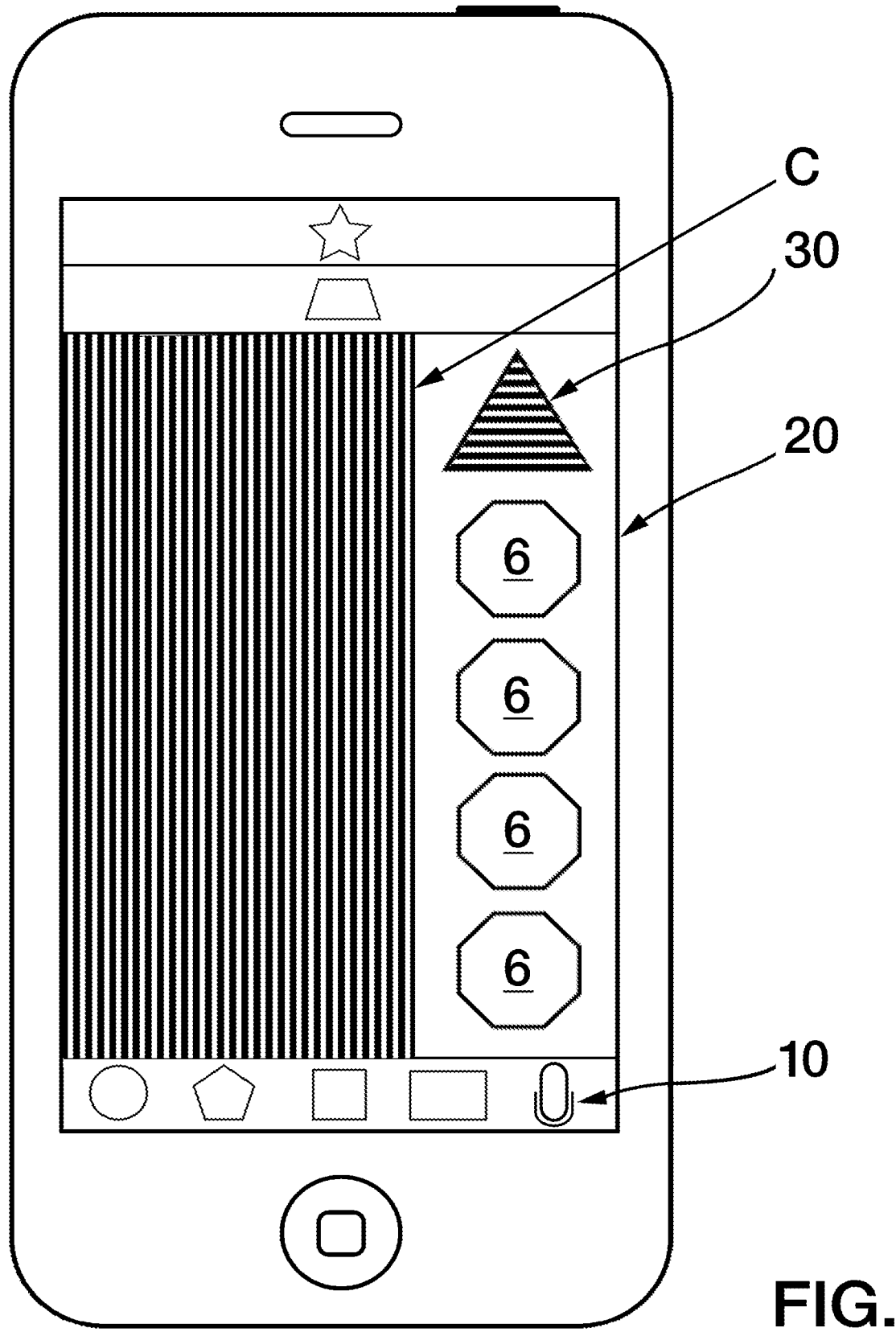
FIG. 7 is a depiction of additional inventive matter to grant user advertising a on mobile phone.
Figure 8:
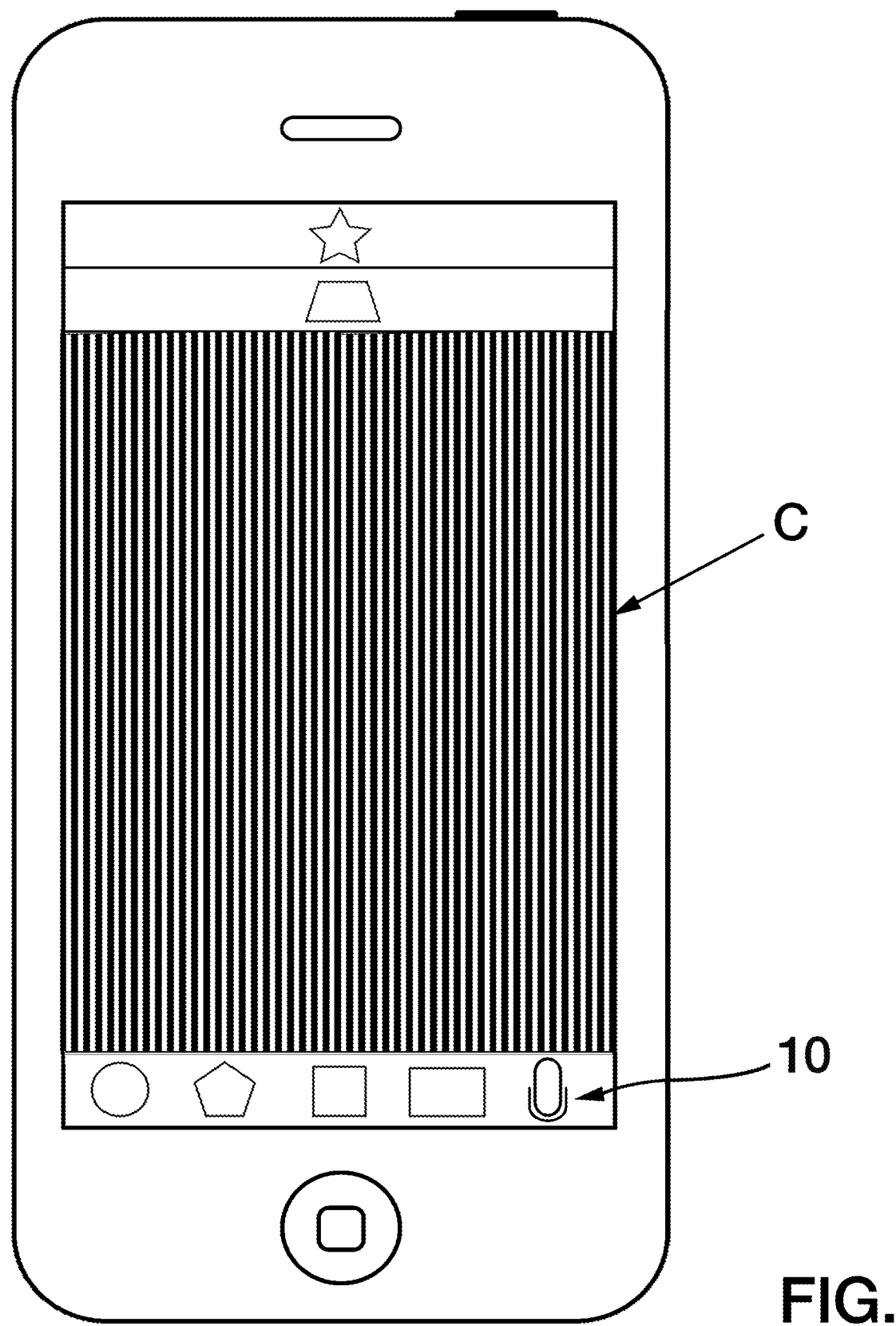
FIG. 8 is a depiction of additional inventive matter to grant user advertising on a mobile phone.

During Time-On-Platform (TOP) a user may use the VUI voice command FIG. 5 10 to return to the platform's content, sending to server system a command to remove ads. Additionally, during (TOP) Time-On-Platform, inventive matter codifies a further embodiment of user engagement, in which the VUI icon FIG. 6 10 may change color, size, shape, typography, or the style of the icon, indicating user may utter "Display ads" to bring ads into view, FIG. 7 20, as randomized notifications periodically signal specific opportunities regarding preselected brands or a targeted gamification reward, such as virtual dollars or a free flat screen TV. When tapped again 10 sends to server system a request to once again remove ads., thereby reinstating platform's content FIG. 8 C.

Figure 9:
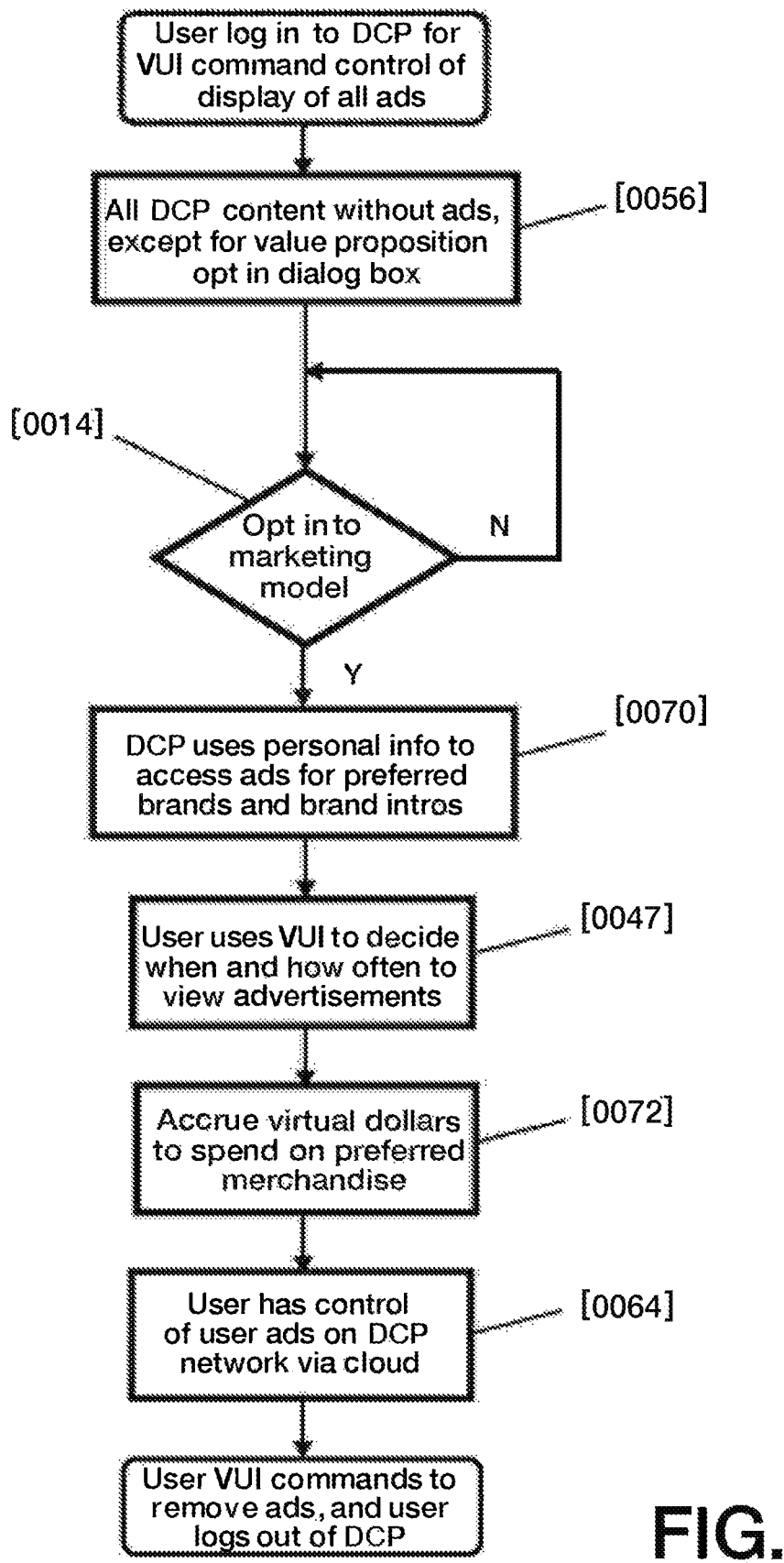
FIG. 9 is a flow chart of the methods of the present invention.

FIG. 9 is a flowchart description of the present invention, and accompanying permission-based user incentives and rewards, and the cloud content network paradigm shift over prior art, in which callouts to specific material offers expanded text. As indicated the preferred embodiments, in relation to digital content platforms, integrates individualized sets of user preferred brands for retrieval, therefore the mapping is virtually the same across digital media platforms, wherein, for the sake of brevity, the detailed explanation of the smartphone drawings may be an applied to desk and laptop computer FIG. 9 and FIG. 10. The differences, however, are noted, but uniformity reinforces accessibility and user engagement, which is an overarching embodiment of the present invention.

FIG. 10 is a depiction of a laptop computer L, which represents desk computers as well (not shown), illustrating content C and preferred embodiment VUI 10 to control all ad views; said VUI location, including but not limited to landing page, subsection pages; upper command bar U (as shown), bottom command bar, the header, sidebar, footer. FIG. 10 also depicts a television T, TV content C, and VUI 10. (Designations laptop L; upper nav U; television T, do not warrant repeating in subsequent drawings.)

Figure 11:
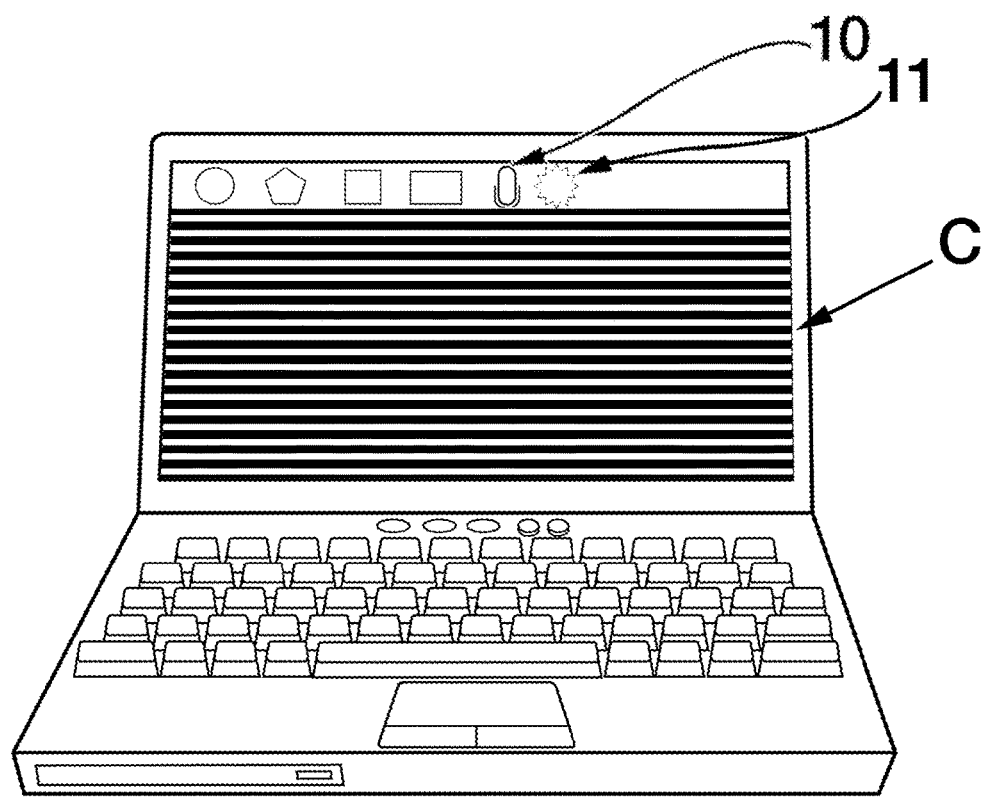
FIG. 11 is a depiction of a computer and a television that further illustrates an exemplary user advertising control.
Figure 11:
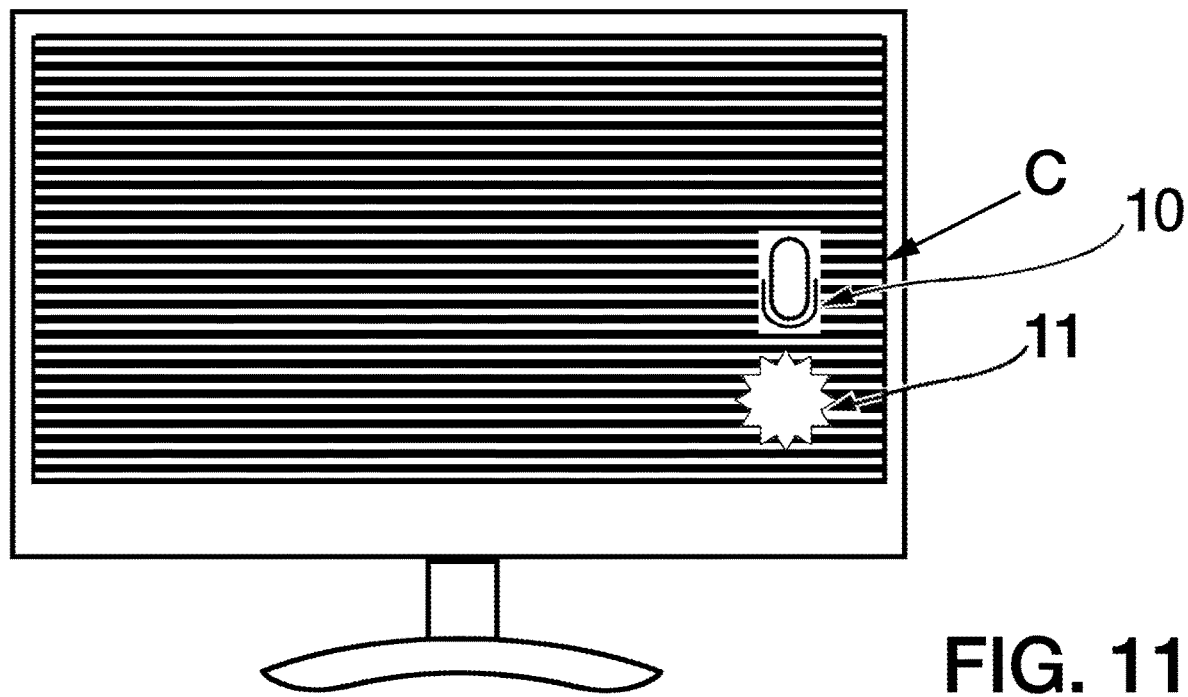

FIG. 11 is a depiction of a laptop computer, which represents desk computers as well (not shown), illustrating content C and preferred embodiment VUI 10, to control all ad views, as will GUI 11 inasmuch as the multi-modal system disclosed herein [0043], may combine speech (VUI) and tactile modes (GUI) in a coordinated manner, or perform unilaterally, to display and remove advertisements, globally, on any aforementioned DCP. If user chooses not to engage either VUI or GUI, the patent eligible limitation still grants user unconditional access to DCP content and does not have to perform any additional actions. Further, the on-screen TV VUI 10 and GUI 11 indicate an action on a TV remote may be taken to preview preferred brands and targeted gamification rewards. If action is taken, a licensee of the present invention mitigates annoying commercial interruptions and user ad-skipping, as the program in progress may be downloaded to a DVR, to be resumed after conclusion of said licensee content. If a DVR is unavailable, the command logo appears superimposed on screen at the conclusion of the content, signaling user engagement may begin. Internet-ready televisions may incorporate the aforementioned computer model, and will map accordingly.

Figure 12:
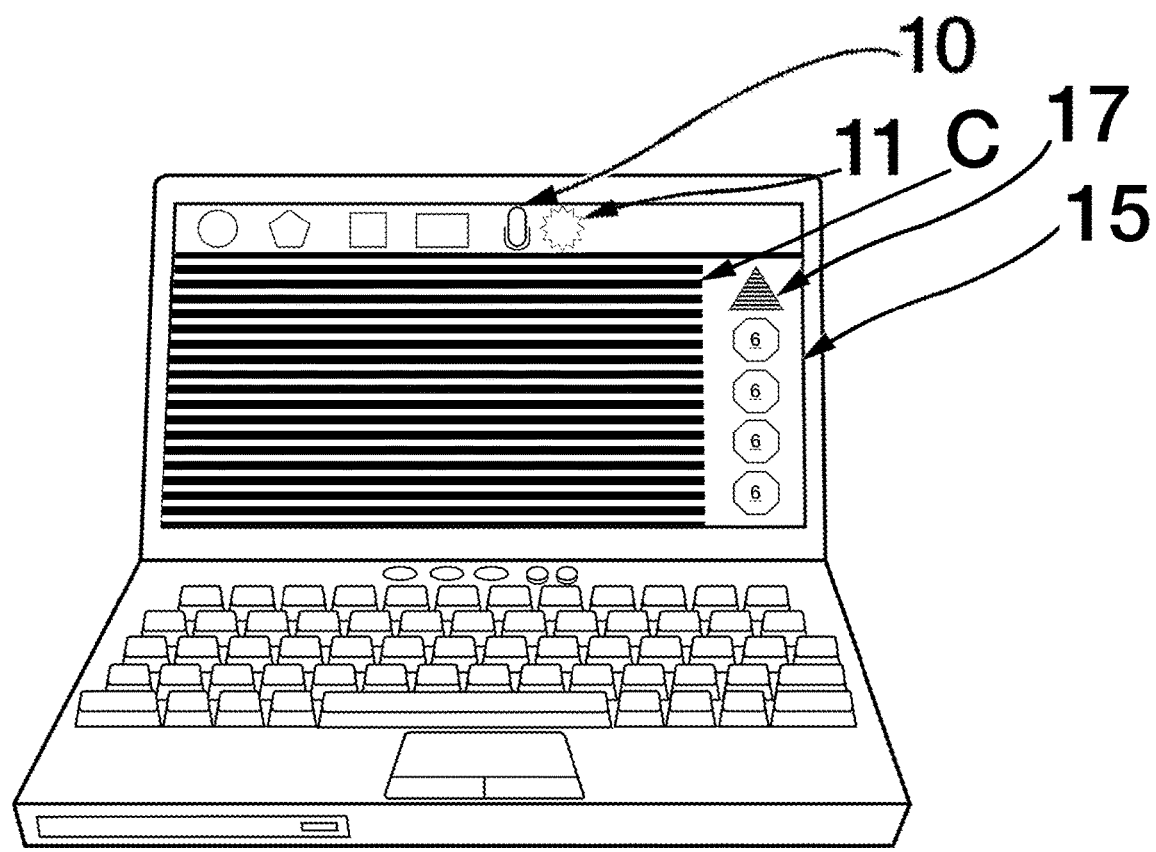
FIG. 12 is a depiction illustrating user preferred advertising introduction on a computer and a television.
Figure 12:
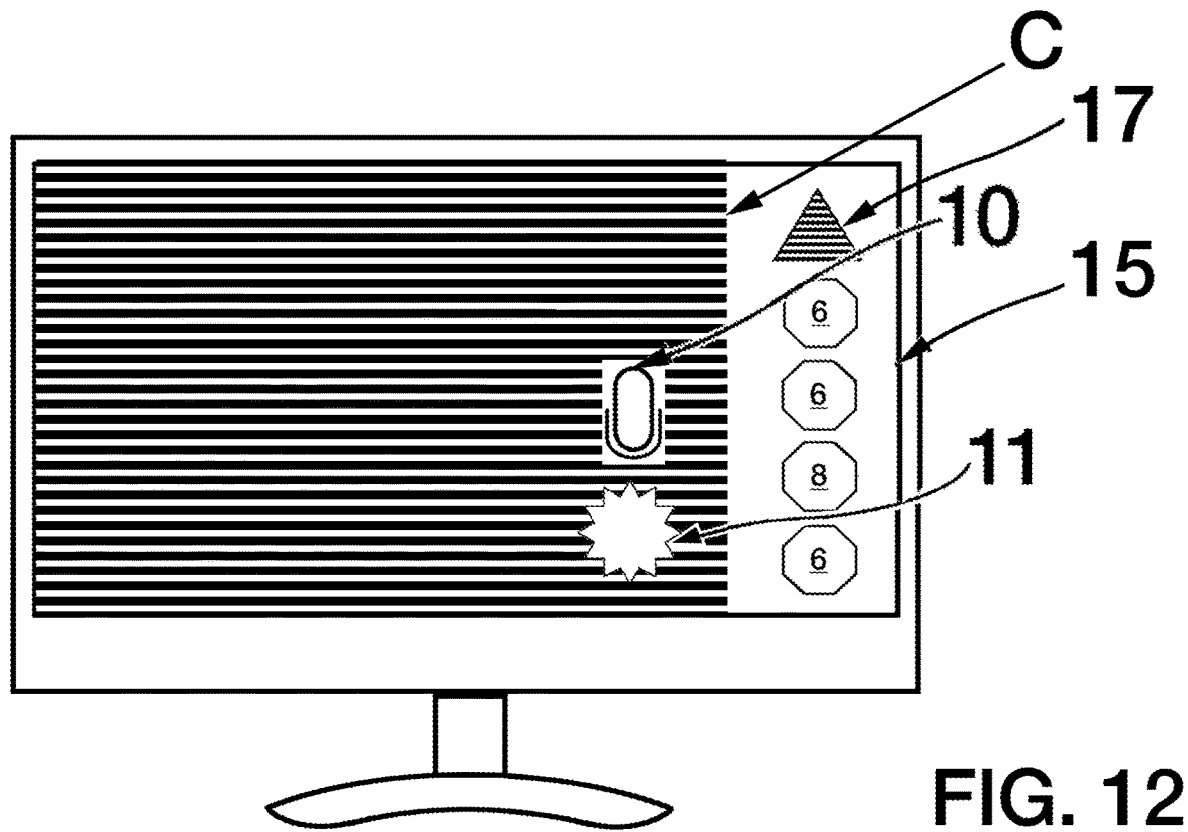
Figure 13:
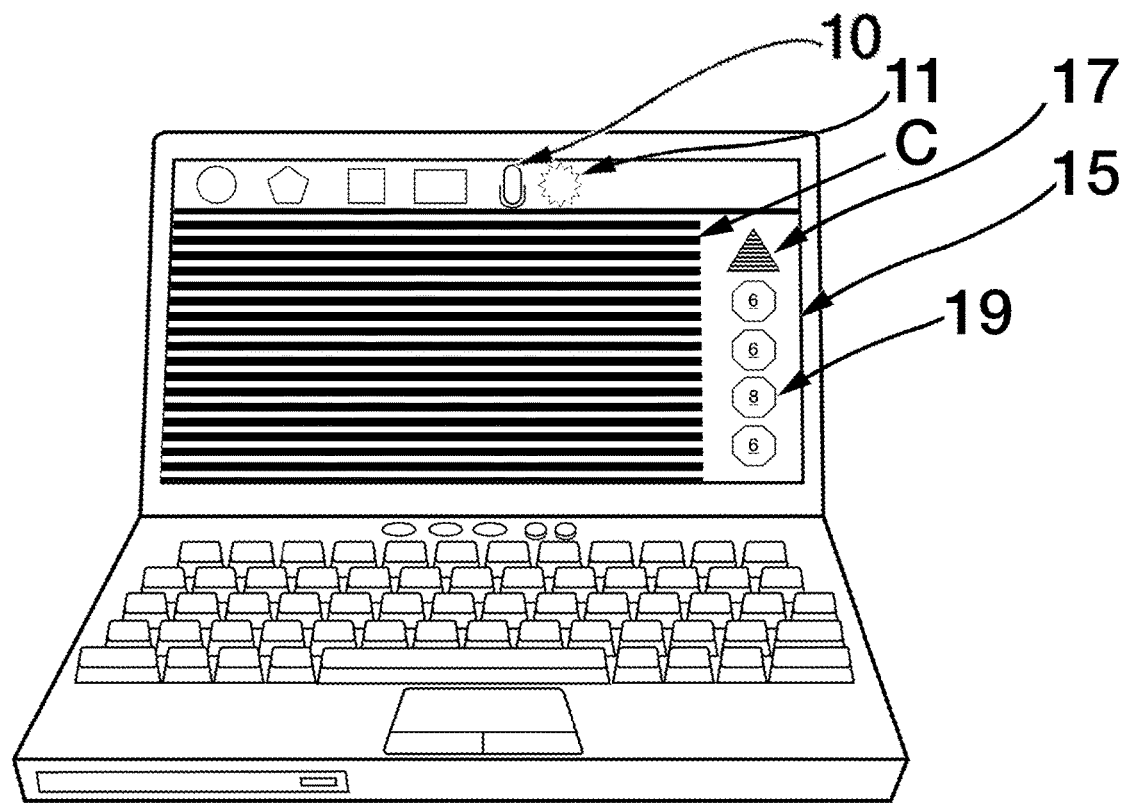
FIG. 13 is a depiction of additional inventive matter to grant user advertising control on a computer and a television.
Figure 13:
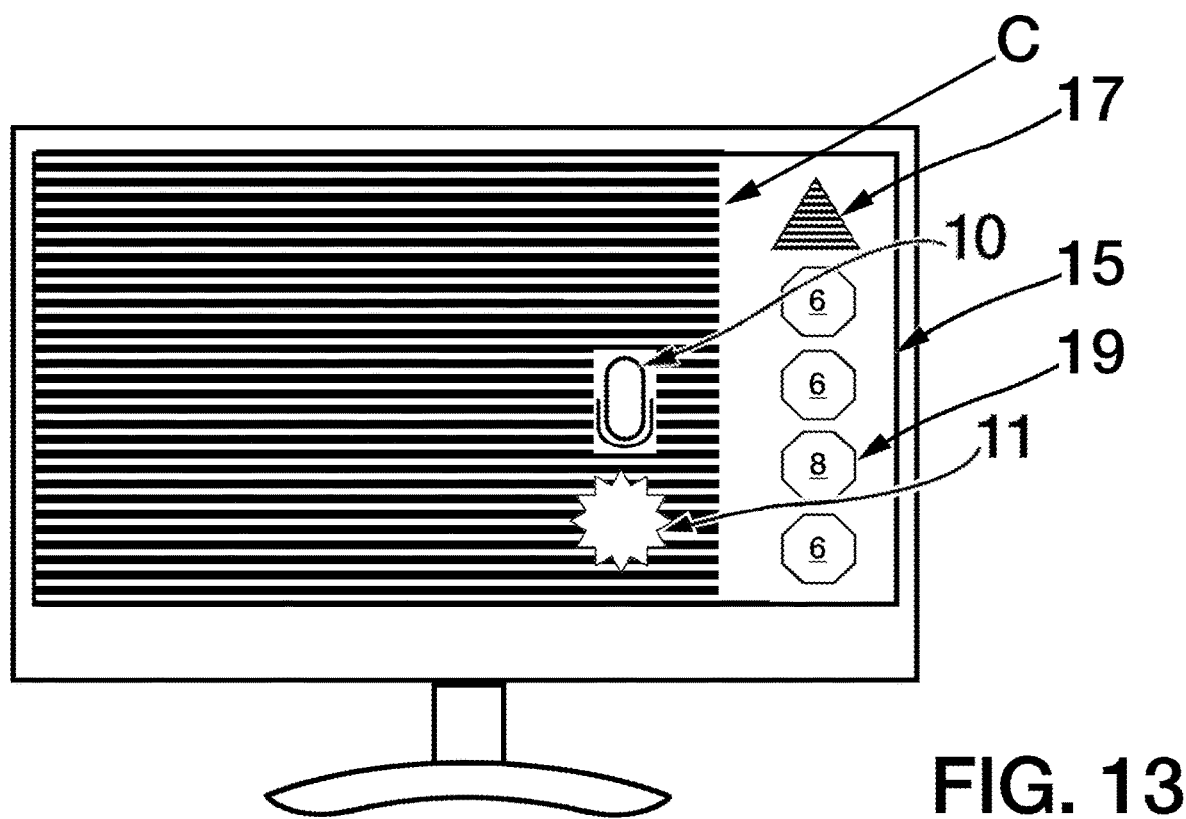
Figure 14:
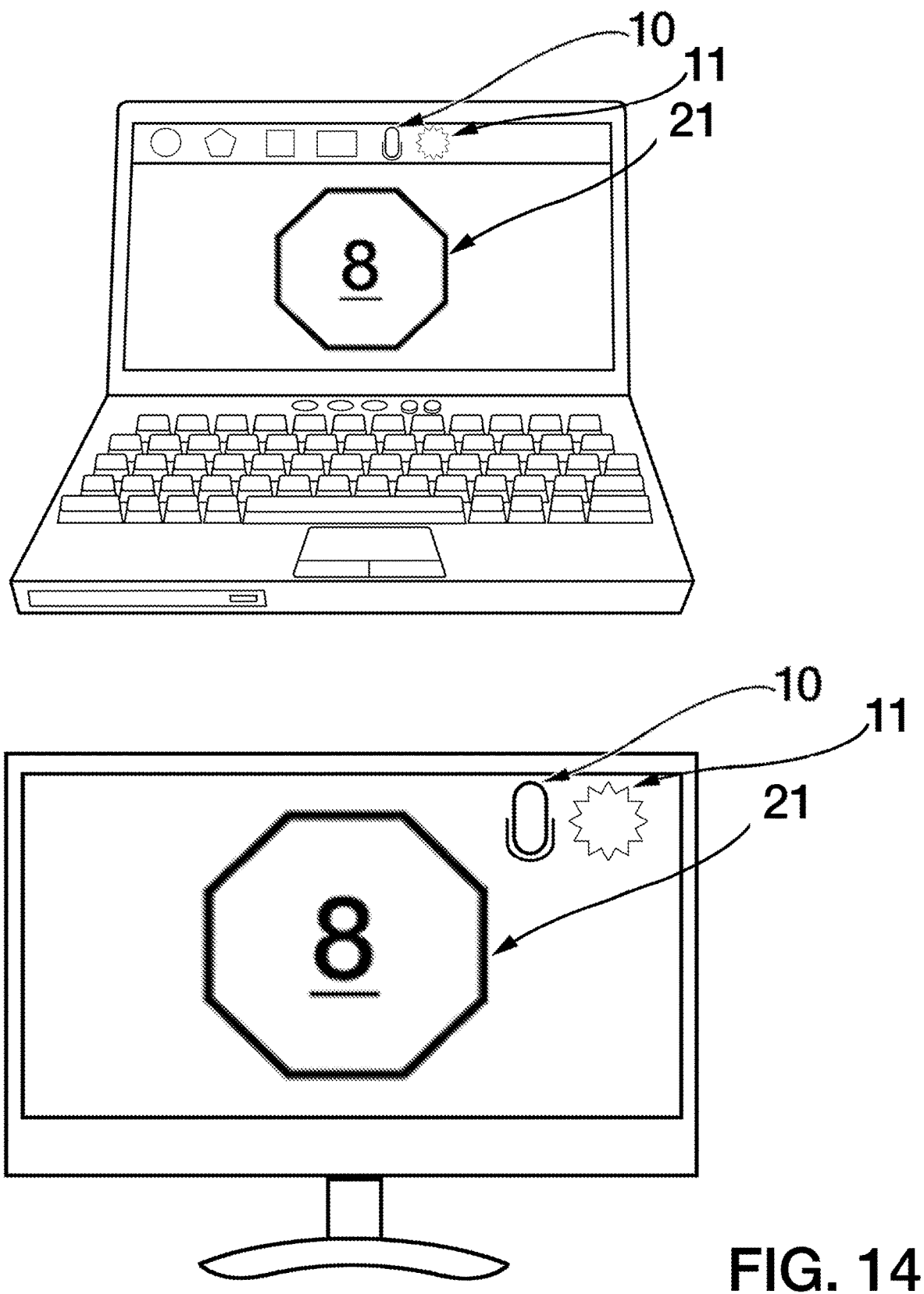
FIG. 14 is a depiction of a laptop computer and a television, each of which illustrates inventive matter to grant users control of digital advertising.

FIG. 12 depicts a laptop computer, TV, content C, and illustrates the embodiment Teaser Icons which continually cycle through location 15 to offer users considerable variety under 17 licensed content providers "umbrella" branding element. Additionally, FIG. 13 19 exemplifies computer and television brand tease selection, which may include game component. FIG. 14 is a depiction of a laptop computer and a television, each of which depicts VUI 10 and GUI 11 activation, as either single action may 21 into view; whereas 8 appears on both laptop computer and TV.

Figure 15:
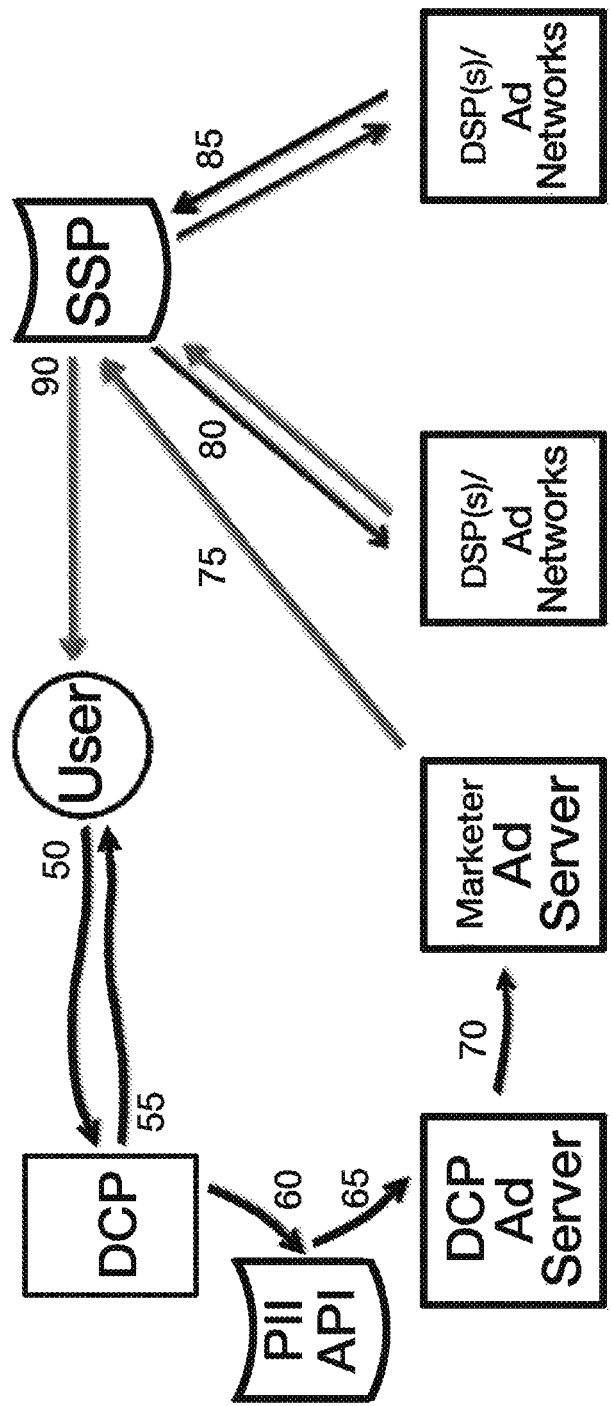
FIG. 15 is a chart that depicts PII-RTB ad serving process.

In one embodiment of the invention, FIG. 15 depicts an RTB behaviorally targeted advertising on DCP, with user control of the display of advertising, as follows: When user logs into DCP 50, which displays no third-party advertising, and the user chooses not to opt into the DCP value proposition dialog box advertisement, the user still has access to the VUI to control of the display of all advertisements, which includes the value proposition ad 55 (which will display periodically, upon icon command, to prompt trial at a later date). From here, the method is basically the same as typical RTB, except that user has sole discretion over the display the final advertisement. A browser navigates to a DCP 60; the DCP sends back code 70 that tells the browser where to get the content 75 and how to format it. Part of the code returned to the browser 80 will include an ad tag that passes information like the DCP ID and ad slot dimensions. From there, the SSP server 85 reads the user's SSP cookie ID; the SSP starts the auction by requesting bids from a host of demand sources, the DSPs 90. If there is no SSP cookie on the machine, the ad inventory can technically still be auctioned, but since nothing is known about the user, the price will be very low. For the DSPs to truly value the impression though, they need to know something about the user that will presumably view it. However, packaged with the bid request is the SSP's cookie ID, along with the URL the impression will deliver on, and the current user's frequency on the DCP. All these factors help the DSP value the impression. First, DSPs are able to match the SSP's cookie ID to their own cookie on that user, which is tied to a cache of marketer data and 3rd party data. Using the cookie ID, the DSP will be able to know if that user recently priced out a car, is flying to Paris in the next 90 days, was recently shopping for shoes, and even more general demographic information about the user such as their age, gender, income range, credit score, etc. In addition to the cookie though, where the ad will appear, the URL, is also important. Many brands don't want their ads to appear on just any DCP even if they want that user. If the user is on a platform with PG-13 content, for example, the advertiser might bid a lower amount or not at all. Similarly, the frequency of that user to the platform they are on is also important to valuation. Advertisers are willing to pay a premium to reach users on their first or second page view on a platform vs. their 50th page view for the simple fact that users are less engaged with platform content and more likely to respond to an ad during their first few page views. Using those pieces of data, the DSPs all value that impression and submit a bid back to the SSP 95 as well an ad redirect to send the user should their bid win the auction. The SSP picks the winning bid and passes the DSP's redirect back to the user 100. From here the process is basically the same as third party ad serving—The user calls the DSP 105, the DSP sends the user the marketer's ad server redirect 110, and user calls the marketer's ad server 115 and the marketer serves the user the final ad 120. However, the DCP has granted the user the right not to view behaviorally targeted advertising, as only the action of the command button icon, which is solely under user control, can display and remove advertising on the DCP.

Figure 16:
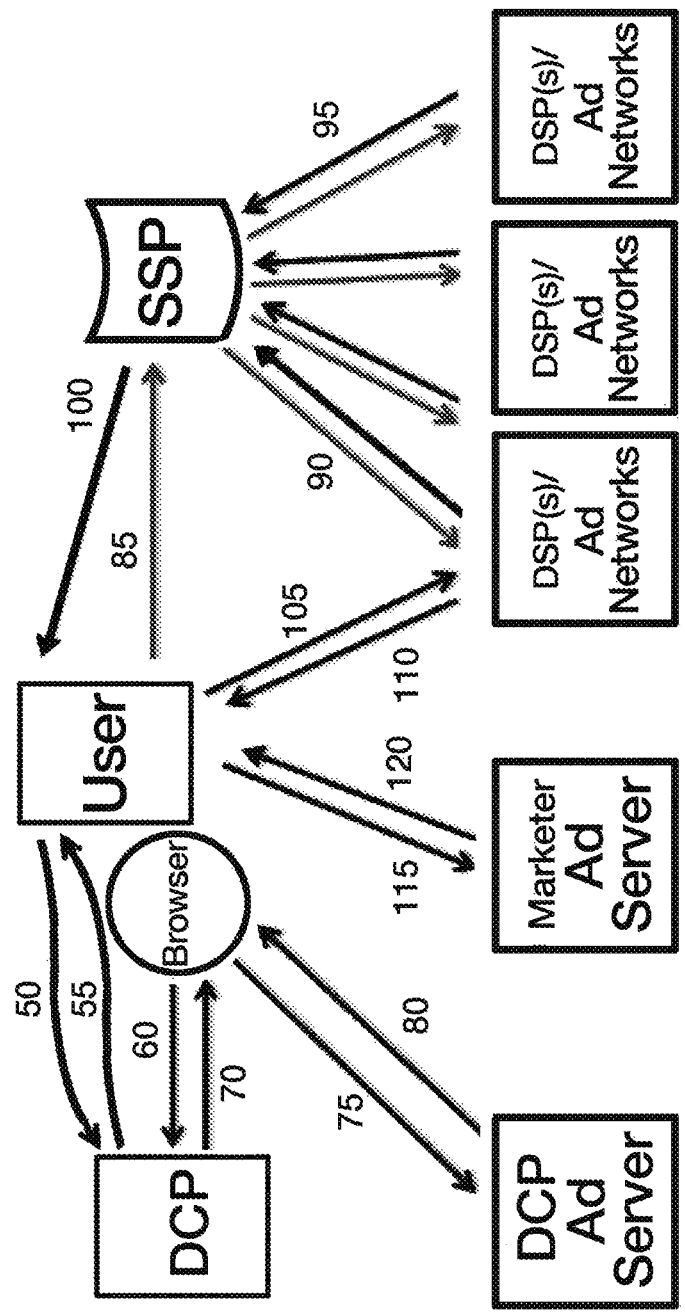
FIG. 16 is a chart that depicts behaviorally targeted advertising.

In another embodiment of the present invention, FIG. 16 depicts an PII-RTB ad serving process as follows: When user logs into DCP 50, which displays no third-party advertisements, and user chooses to opt into DCP value proposition, user grants DCP access to user PII while DCP, in turn, grants user total control of the display of all advertisements through the indication of VUI 55. Further, user opt into value proposition grants DCP permission to send user ID to enterprise data 60, thereby matching enterprise data services API to user PII. The API accepts PII as input 65 and performs highly accurate entity resolution using that PII and then passes data bundle enhancements associated with that PII API to the DCP Ad Server. (Some integrations can only accept data when the event is sent from the browser. They require events on the client since they rely on cookies and most of those tools do not have an API that Segment can send server-side data. In this regard, DCP may access behaviorally targeted advertising.) The DCP Ad Server bundles the enterprise date user PII API with information like the DCP's ID, ad slot dimensions and RTB-enabled SSP, which then passes to the Marketer Ad Server 70. From there, the Marketer Ad Server calls the SSP server 75 where the SSP reads that SSP ID, and starts the auction by requesting bids from a host of demand sources, the DSP(s). Since the PII AP knows so much about the user, the price will be high and will more readily integrate with the DCP context. The DSPs can truly value the impression, because they know about the user who is (presumably going to see it. All these factors help the DSP value the impression. For example, the DSP will be able to know household demographics, adult age ranges, children's age ranges, number of adults and number of children in the household, marital status, household interests, interest categories include reading, food/cooking, travel, exercise, health/self-improvement, hobbies, pets, sports, collectibles, investments, computers, electronics, home improvement, games/contests, photography, etc. True enterprise data is far and away the driver of higher bids. Advertisers are willing to pay a premium to reach users on their first or second page view on a platform vs. their 50th page view for the simple fact that users are less engaged with DCP content and more likely to respond to an ad during their first few page views. Using those pieces of data, the DSPs all value that impression and submit a bid back to the SSP 80-85. The SSP picks the winning bid 90, which still leaves the user to decide whether or not to initiate the VUI to display the advertising, completing the inventive matter of the PII-RTB ad serving process.

The present invention is nonobvious and relies on a computer to perform the specific steps and limitations, as follows: (1) The VUI icon is not advertising and it is displayed with the content, which takes it out of the realm of a pop-up menu. (2) The VUI only requires a single verbal command to display advertisements, and a subsequent single verbal command to remove advertisements, which again takes it out of being a menu with options or a teaser, whereas teasers in respect to the present invention constitute advertising, because the display teasers are initiated by the single VUI verbal command, i.e., "Display ads." (3) Selecting the icon provides an indication to the digital media platform and affects the control at that level, which takes it out of the realm of a toolbar app that removes/filters advertising locally. (4) The user still has unconditional access to the content and does not have to perform any additional actions, which takes it out of presenting a subscription menu, reminders, pop-ups or some other requirement when the advertising is off The art of record that removes or limits advertising places restriction on the user's ability to access data without ads and/or requires the user perform some action that generates value, such as pay a fee. The novelty of the present invention rests in the simplicity of the VUI icon that is always displayed and acts as both an "on and an off command" for advertising, with the additional requirements that all advertising is stopped, allowing full access to content and not requesting further user interactions beyond providing the icon, which places the user in complete control of advertising without any of the restriction described in the related art.

It will thus be appreciated that those of ordinary skill in the relevant art will be able to devise numerous alternative arrangements that, while not shown or described herein, embody the principles of the invention and thus are within its spirit and scope.

While various embodiments of the present invention have been described above, it should be understood that they have been presented by way of example only, and not limitation. It will be understood by those of ordinary skill in the relevant art that various changes in form and details may be made therein without departing from the spirit and scope of the invention as defined in the appended claims. Accordingly, the breadth and scope of the present invention should not be limited by any of the above-described embodiments, but should be defined only in accordance with the following claims and their equivalents.

The invention claimed is:

1. A computer-implemented method for granting user control of display of advertising on a digital content platform (DCP), comprising the steps of:
   receiving, at a server, from a plurality of users, a user request, display advertisements, initiating;
   continuously monitoring the DCP for the user verbal command to a Voice User Interface;
   (VUI) indicating user verbal recognition is requested;
   scanning recognized verbal commands at the VUI for the key phrase on the digital content platform (DCP);
   initiating a connection between the DCP and a server when the key phrase is detected;
   requesting, from the server, automated analytic access to big data;
   retrieving personally identifiable information (PII) of said user; and
   displaying user-centric advertisements on the DCP from a plurality of ad-serving networks;
   scanning recognized verbal commands at the VUI for said user key phrase remove advertisements on a digital content platform (DCP);
   initiating a connection between the DCP and the server when the key phrase is detected;
   and requesting, from the server, to remove the displaying of any advertisements on the DCP;
   granting DCP unconditional permission to generate a user PII profile;
   applying big data analytics to the user PII profile:
   sorting PII profile based on user-centric insights;
   matching user-centric insights with ad-serving networks;
   displaying on the DCP user-centric advertisements;
   and scanning recognized verbal commands at the VUI for key phrase remove advertisements;
   and initiating a connection between the DCP and a server when the key phrase is detected;
   and requesting, from the server, to remove the displaying of any advertisements on the DCP.

2. The method of claim 1, further comprising
   a non-transitory machine readable storage medium having stored thereon a computer program for connecting PII with advertising intelligence, the computer program comprising a set of instructions for causing the machine to perform the steps of: receiving a unique identifier of a user; initiating said VUI on the DCP; accepting, from the server, user verbal command to display advertisements on the DCP; granting DCP unconditional permission to generate the user PII profile;
   applying big data analytics to the user PII profile; sorting PII profile based on user-centric insights; correlating user-centric insights with ad-serving networks;
   displaying on the DCP user-centric advertisements; transmitting the DCP ecosystem, through cloud computing, with unique identifier of said user and user-centric advertisements; and storing said user-centric advertisements on the non-transitory machine readable storage medium.

3. The method of claim 1, further comprising, said DCP permanently display a VUI icon on the DCP.

4. The method of claim 1, further comprising, said DCP not displaying third-party advertisements on the DCP upon user login.

5. The method of claim 1, further comprising,
   said DCP displaying, upon user login, only an advertisement for the DCP, in a form of a value proposition dialog box, wherein a user selectively indicates acceptance of the proposition, with the verbal command to the VUI display advertisements; whereas acceptance grants said DCP access to the PII of user, correlates user-centric insights with ad-serving networks, and displays advertisements; whereas the verbal command to the VUI remove advertisements indicates rejection of said proposition, which removes value proposition dialog box from the DCP.

6. The method of claim 3, further comprising, said DCP to setup and run on said DCP an advertising network; correlating user-centric insights with ad-serving networks; accessed from a plurality of ad networks.

7. The method of claim 1, further comprising,
   requesting from said server to display advertisements on the DCP gives user control of the display of all advertisements on DCP; and requesting from said server not to display advertisements on the DCP gives user control of the display of all advertisements on DCP.

8. The method of claim 5, further comprising,
   requesting from said server not to display advertisements on the DCP nevertheless grants user unconditional access to all content on said DCP, without requiring any additional actions performed by user.

9. The method of claim 1 further comprising,
   initiating said VUI to display advertisements on DCP upon user request, initiated by verbal command of key phrases to VUI on a DCP; said phrases my include but are not limited to, on, off, opt in, opt out, display advertisements, remove advertisements, display ads, remove ads, show advertisements, no advertisements, yes ads, no ads.

10. The method of claim 1 further comprising,
    initiating said VUI to communicate with a digital content platform, including but not limited to such devices as mobile devices (e.g., cellular phone or tablet), computing devices (e.g., a personal computer or laptop device) and such electronic devices as a television.

11. The method of claim 1 further comprising, a multimodal server of said VUI and a Graphical User Interface (GUI); constituting a modality of user interactions;
    requesting the DCP, through the VUI or GUI,
    which constitute the verbal command, display advertisements, or through the tactility of touch, the action on, respectively, access to the PII of user;
    and correlating user-centric insights with ad-serving networks;
    displaying user-centric advertisements on the DCP from a plurality of ad-serving networks; initiated by a verbal command to said VUI display advertisements on said DCP, or a single action of said GUI, comprising the action on, and, receiving, at the server, a user request, initiated by a verbal command to said VUI remove advertisements, or a single action of said GUI, comprising the action off, and, as with either modality, requesting from the server, to remove the displaying of any advertisements on said DCP.

12. An apparatus, comprising:
    a processor;
    a memory storing instructions that causes the processor to perform operations during execution of the instructions, the operations comprising:
    receiving, at a server, from a plurality of users, a user request, display advertisements, initiating;

continuously monitoring the DCP for the user verbal command to a Voice User Interface (VUI) indicating user verbal recognition is requested;
scanning recognized verbal commands at the VUI for the key phrase on the digital content platform (DCP);
initiating a connection between the DCP and a server when the key phrase is detected;
requesting, from the server, automated analytic access to big data;
retrieving personally identifiable information (PII) of said user; and
displaying user-centric advertisements on the DCP from a plurality of ad-serving networks;
scanning recognized verbal commands at the VUI for said user key phrase remove advertisements on a digital content platform (DCP);
initiating a connection between the DCP and the server when the key phrase is detected;
and requesting, from the server, to remove the displaying of any advertisements on the DCP;
granting DCP unconditional permission to generate a user PII profile;
applying big data analytics to the user PII profile:
sorting PII profile based on user-centric insights;
matching user-centric insights with ad-serving networks;
displaying on the DCP user-centric advertisements;
and scanning recognized verbal commands at the VUI for key phrase remove advertisements;
and initiating a connection between the DCP and a server when the key phrase is detected;
and requesting, from the server, to remove the displaying of any advertisements on the DCP.

* * * * *